(12) United States Patent
Hibino et al.

(10) Patent No.: US 7,742,610 B1
(45) Date of Patent: Jun. 22, 2010

(54) AUTOMOBILE AUDIOVISUAL SYSTEM

(75) Inventors: Masahiro Hibino, Tokyo (JP); Toyoaki Kitano, Tokyo (JP); Ikuo Saga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1558 days.

(21) Appl. No.: 10/089,178

(22) PCT Filed: Aug. 7, 2000

(86) PCT No.: PCT/JP00/05290

§ 371 (c)(1),
(2), (4) Date: Mar. 27, 2002

(87) PCT Pub. No.: WO02/12022

PCT Pub. Date: Feb. 14, 2002

(51) Int. Cl.
*H04R 5/02* (2006.01)
*H04R 1/10* (2006.01)
*H04B 1/00* (2006.01)
*H03G 9/00* (2006.01)
*H03G 3/00* (2006.01)
*H05K 11/00* (2006.01)
*H04M 1/00* (2006.01)

(52) U.S. Cl. .................. 381/302; 381/86; 381/74; 381/102; 381/109; 381/107; 455/345; 455/569.2

(58) Field of Classification Search .................. 381/86, 381/302, 102–109, 74, 24, 25; 455/345, 455/569.2
See application file for complete search history.

(56) References Cited

U.S. PATENT DOCUMENTS 4,352,200 A * 9/1982 Oxman ................. 455/41.2
4,754,486 A * 6/1988 Stafford et al. ............ 381/86
5,108,335 A   4/1992 Carey et al.
5,185,803 A * 2/1993 Moyski et al. ............ 381/86
5,661,811 A * 8/1997 Huemann et al. .......... 381/309
6,330,337 B1 * 12/2001 Nicholson et al. .......... 381/86
6,567,655 B1 * 5/2003 Wietzke et al. ........... 455/345
6,690,803 B2 * 2/2004 Dykstra .................... 381/86

FOREIGN PATENT DOCUMENTS

| DE | 2807483     | 8/1979 |
| DE | 3400368     | 7/1985 |
| DE | 3721279     | 2/1988 |
| DE | 40 25 973 A1 | 5/1991 |
| DE | 43 00 848 A1 | 8/1993 |
| DE | 19510219    | 9/1996 |
| EP | 0 878 949 A2 | 11/1998 |
| EP | 0 920 170 A2 | 6/1999 |
| GB | 2246688 A * | 2/1992 |

(Continued)

OTHER PUBLICATIONS

Applicant's admitted prior art, p. 1, one 13-p. 3.*

*Primary Examiner*—Devona E. Faulk
(74) *Attorney, Agent, or Firm*—Birch, Stewart, Kolasch, & Birch, LLP.

(57) ABSTRACT

A control signal is generated by an operating means for being operated by a driver. In response to this control signal, an input signal to rear-seat headphones is temporarily attenuated or is replaced by another given signal or a transmission signal from the driver.

3 Claims, 16 Drawing Sheets

FOREIGN PATENT DOCUMENTS

| | | |
|---|---|---|
| GB | 2 315 652 A | 2/1998 |
| JP | 61-171391 U | 10/1986 |
| JP | 61-278447 A | 12/1986 |
| JP | 6-194218 A | 7/1994 |
| JP | 10-76949 A | 3/1998 |
| JP | 11-75284 A | 3/1999 |
| JP | 11-170922 A | 6/1999 |
| JP | 2000-065592 | 3/2000 |
| JP | 2000-266558 A | 9/2000 |

\* cited by examiner

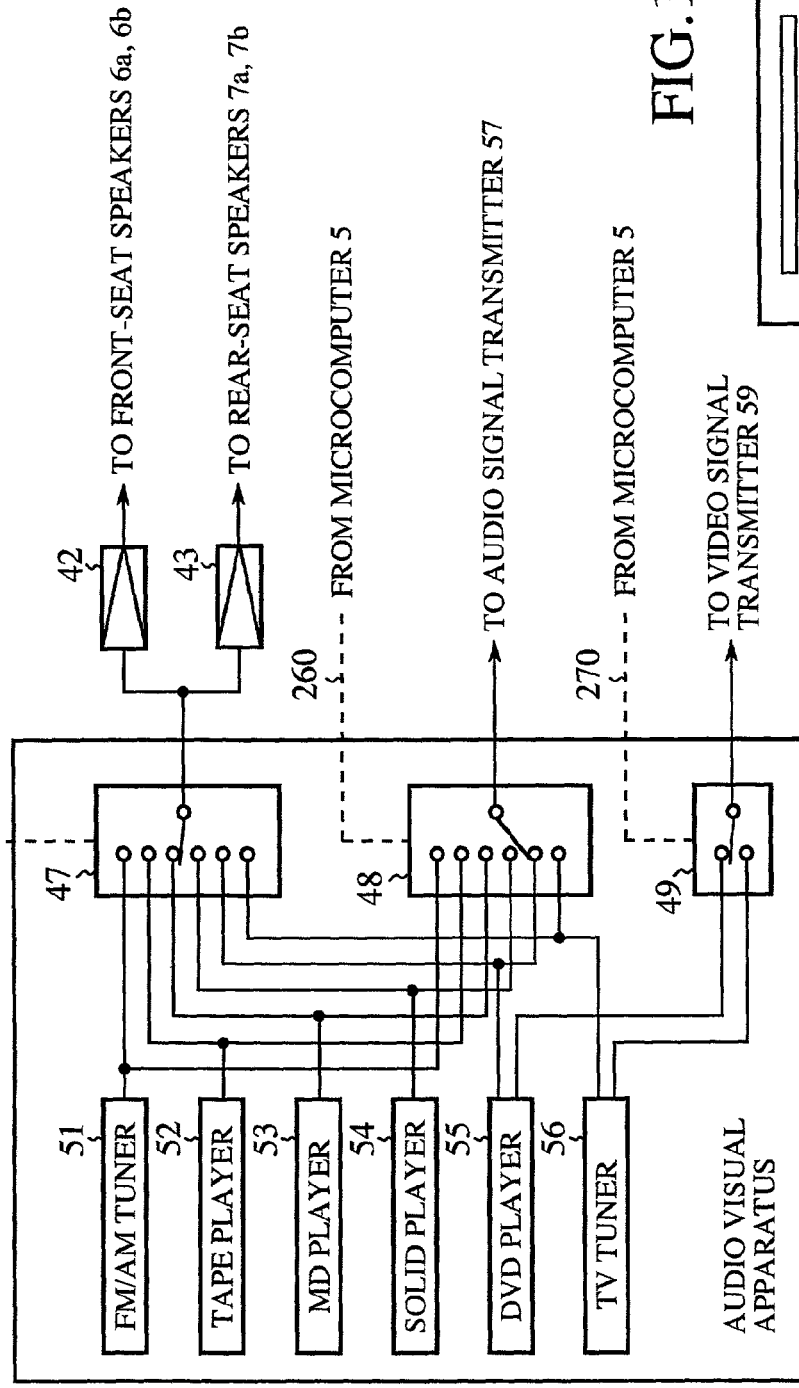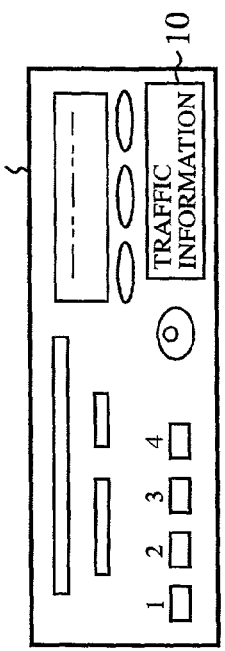

AUTOMOBILE AUDIOVISUAL SYSTEM

This application is the national phase under 35 U.S.C. §371 of PCT International Application No. PCT/JP00/05290 which has an International filing date of Aug. 7, 2000, which designated the United States of America.

TECHNICAL FIELD

This invention relates to an entertainment system for enjoying video and audio inside a motor vehicle and, more particularly, to an onboard audio visual system in which a driver (inclusive of a front-seat passenger) and rear-seat passengers selectively use various audio visual devices by their own preferences.

BACKGROUND ART

FIG. 1 is a circuit diagram showing a circuit configuration of a conventional onboard audiovisual system. This apparatus is called as a rear entertainment system in which a driver and rear-seat passengers enjoy listening to audio and watching at video. This kind of system is found also in U.S. Pat. No. 5,661,811.

Referring now to FIG. 1, reference numeral 51 denotes a frequency modulation (FM)/amplitude modulation (AM) tuner, reference numeral 52 a cassette tape player, and reference numeral 53 a compact disc (CD) player or a minidisk (MD) player. Reference numerals 21, 22 denote audio selecting circuits for selecting audio signals reproduced by these audio devices 51, 52, 53. Reference numerals 6a, 6b denote front-seat speakers disposed in positions obliquely before a driver's seat and a front passenger's seat, and a reproduced audio signal of the audio switching circuit 21 is inputted thereto through a volume controller 23 and an amplifier 42. Reference numerals 7a, 7b denote rear-seat speakers, and a reproduced audio signal of the audio selecting circuit 22 is inputted thereto through an amplifier 43 and an audio signal switching circuit 20. In addition, the switched output from the audio signal switching circuit 20 is inputted to headphones 8a, 8b for two persons. Reference numeral 5 denotes a microcomputer which outputs a control signal in response to a command signal to be outputted from a rear-seat controller 9 and a front-seat controller 41 to thereby control the switching operation of the audio selecting circuits 21, 22 and audio switching circuit 20 through lines 25, 26, 27.

The operation of the conventional onboard audio visual system will then be described.

Now, suppose that the audio selecting circuits 21, 22 and the audio switching circuit 20 are selected by driver's operation of the front seat controller 41 as shown in FIG. 1, and that the reproduced signal from the FM/AM tuner 51 is outputted. The driver controls the volume of the front-seat speakers 6a, 6b and the rear-seat speakers 7a, 7b by the volume controller 23, 24. The front-seat speakers 6a, 6b are driven by the output of the amplifier 42 and the rear-seat speakers 7a, 7b by the output of the amplifier 43. The driver can listen to the reproduced audio output from these speakers 6a, 6b, 7a, 7b.

Here, in case if the rear-seat passengers wish to listen to another audio of an audio device different from that (FM/AM tuner 51) selected by the driver, a command signal is sent to the microcomputer 5 by using the rear-seat controller 9 disposed nearby. Then, in response to the control signal sent from the microcomputer 5 through the signal line 26 shown by a dotted line, the audio selecting circuit 22 selects one of the audio devices 51, 52, 53 which the rear-seat passengers want. Further, in response to another control signal sent from the microcomputer 5 through the signal line 27, the audio signal switching circuit 20 switches the output from the rear-seat speakers 7a, 7b to the headphones 8a, 8b in order to output thereto. Therefore, the reproduced audio signal from the selected audio device is amplified by the amplifier 43 and, after the volume is controlled by a controller (not shown), is inputted into the headphones 8a, 8b for outputting a reproduced audio.

Under the state so far mentioned, the audio selecting circuit 21 remains unchanged as selected by the driver and is not switched thereafter. Therefore, the driver will listen only to the audio from the front-seat speakers 6a, 6b. The rear-seat passengers, on the other hand, will listen to the audio selected by themselves with the headphones 8a, 8b. In this manner, the driver and the rear-seat passengers do not suffer from interference in reproduced audio, so that the respective persons can enjoy the reproduced audio output from the respective audio devices.

In the conventional onboard audio visual apparatus thus arranged as above, while the rear-seat passengers enjoy the audio with the headphones selected by themselves, their ears are stopped by the headphones, with the result that the rear-seat passengers fail to hear the foreign sounds such as emergency alarms, or the like received while the motor vehicle is running. Particularly, in case need arose that the driver should have some communication with the rear-seat passengers, the driver faces a difficulty with their communication.

Since the audio is listened to by the headphones, similar problem as the above caused even in an onboard audio visual system in which a video signal output from such as a digital versatile disk (DVD) player is able to listen to and watch on a display disposed in the rear seat.

Further, since cables are laid out inside the motor vehicle from the audio device disposed on the front-seat to the headphones, the freedom in disposing and handling the apparatus is restricted.

Still further, since the rear-seat speakers are not driven while the rear-seat passengers are enjoying the audio with the headphones, the incomplete sound field around the driver's is generated.

This invention has been made to solve the above and other problems and an object thereof is to provide an onboard audio visual system (a system which handles video and audio as well as that which handles only audio are hereinafter generically referred to as "an onboard audio visual system"). This facilitates the communication between the driver and the rear-seat passengers.

Further, another object of the invention is to provide an onboard audio visual system in which the number of cables laid out inside the motor vehicle is reduced, in which the more greater freedom in disposition is accomplished, and in which the use of the system by the rear-seat passengers is made much easier.

Still further, another object of the invention is to provide an onboard audio visual system in which a sound field of good quality is offered not only to the rear-seat but also to the driver.

DISCLOSURE OF THE INVENTION

In an onboard audio visual system of the present invention having a plurality of audio visual devices; a front-seat speaker and a rear-seat speaker for outputting reproduced audio from the audio visual devices; and a headphone for rear-seat passengers for independently outputting a reproduced audio from one of the audio visual devices arbitrarily selected by the rear-seat passengers through a rear-seat controller, comprises operating means for performing a predetermined operation;

control means for outputting a first control signal based on what sort of operation is performed by the operating means; and first signal attenuating means for attenuating an input signal to the headphone in response to the first control signal.

Therefore, when the driver wishes to send something to the rear-seat passengers, the input signal to the headphone is attenuated by the operation of the driver himself/herself, thereby facilitating the communication with the rear-seat passengers.

In an onboard audio visual system of the present invention having a plurality of audio visual devices; a front-seat speaker and a rear-seat speaker for outputting a reproduced audio from the audio visual devices; and a headphone for rear-seat passengers for independently outputting a reproduced audio from one of the audio visual devices arbitrarily selected by the rear-seat passengers through a rear-seat controller, comprises operating means for performing a predetermined operation; control means for outputting a first control signal based on what sort of operation is performed by the operating means; acoustic signal generating means for generating a given calling signal; and first audio-signal switching means for temporarily switching, in response to the first control signal, from the reproduced audio signal output from the audio visual device to the calling signal, and for outputting the temporarily switched signal to the headphone.

Therefore, when the driver wishes to communicate with the rear-seat passengers, the driver can make know more clearly his/her own intention by inputting in advance the calling signal to the headphone of the rear-seat passengers.

In an onboard audio visual system of the present invention further comprises second signal attenuating means for attenuating an input signal to the rear-seat speaker in response to the first control signal output from the control means.

Therefore, since the audio of the rear-seat speaker is attenuated together with that of the headphone, the rear-seat passengers are less likely to be affected by the surrounding audio. This affords the rear-seat passengers more easy perception to the driver's calling.

In an onboard audio visual system of the present invention having a plurality of audio visual devices; a front-seat speaker and a rear-seat speaker for outputting a reproduced audio from the audio visual devices; and a headphone for rear-seat passengers for independently outputting a reproduced audio from one of the audio visual devices arbitrarily selected by the rear-seat passengers through a rear-seat controller, comprises operating means for performing a predetermined operation; control means for outputting a first control signal based on what sort of operation is performed by the operating means; a hand-free automobile telephone; and first audio-signal switching means for temporarily switching, in response to the first control signal, from the reproduced audio signal output from the audio visual device to a transmission microphone signal output from the hand-free automobile telephone, and for outputting the temporarily switched signal to the headphone.

Therefore, since the driver's voice is transmitted from the transmitting microphone of the hand-free automobile telephone to the rear-seat passenger's headphone, better communication is attained between the driver and the rear-seat passengers.

In an onboard audio visual system of the present invention in response to a busy state where the first audio-signal switching means is being switched to output the transmission microphone signal to said headphone, the first control signal of said control means is supplied to the first audio-signal switching means so as to hold the switched state over the busy state.

Therefore, the speech of the driver will not be interrupted even if the period of the original control signal has elapsed. Further, since the driver is free to leave his/her hand off the operating means, the driving is not disturbed.

In an onboard audio visual system comprises a plurality of audio visual devices; first audio-selecting means for selecting one of reproduced audio signals output from the audio visual devices by a driver, and for outputting the reproduced audio signal to a front-seat speaker and a rear-seat speaker; video selecting means for arbitrarily selecting one of reproduced video signals output from the audio visual devices by rear-seat passengers through a rear-seat controller; second audio-selecting means for arbitrarily selecting one of the reproduced audio signals output from the audio visual devices by the rear-seat passengers through the rear-seat controller, or a reproduced audio signal attended on the reproduced video signal output from the video selecting means; operating means for performing an operation by the driver; control means for outputting a first control signal based on what sort of operation is performed by the operating means; first signal-attenuating means for attenuating the reproduced audio signal selected by the second audio-selecting means in response to the first control signal; audio signal transmitting-receiving means for transmitting and receiving a light signal or a radio wave signal modulated by the audio signal output from the first signal-attenuating means to output a demodulated audio signal to a headphone for the rear-seat passengers; and video signal transmitting-receiving means for transmitting and receiving the light signal or the radio wave signal modulated by the video signal output from the video selecting means to output a demodulated video signal to a display for the rear-seat passengers.

Therefore, this arrangement offers not only better communication between the driver and the rear-seat passengers but also transmits the reproduced audio signal and the reproduced video signal of the audio visual devices by converting them into light or radio wave. Thus, the time necessary for laying out cables is saved, and there is provided a convenient system in which the rear-seat passengers are not encumbered by the cables.

In an onboard audio visual system of the present invention second signal-attenuating means for attenuating the reproduced audio signal, which is output from said first audio-selecting means to the rear-seat speaker, in response to the first control signal, is disposed in a supply line of the reproduced audio signal.

Therefore, at the time of communication from the driver to the rear-seat passengers; the audio of the rear-seat speaker is attenuated together with the audio of the headphone. Thus, the rear-seat passengers who are less likely to be affected by the surrounding audio and the rear-seat passengers are afforded more easy perception to the calling by the driver. In addition, since the reproduced audio signal and the reproduced video signal of the audio visual devices are transmitted by converting them into light or radio wave, this arrangement obviates not only the laying out of the cables but also provides the rear-seat passengers a convenient system.

In an onboard audio visual system comprises a plurality of audio visual devices; first audio-selecting means for selecting one of reproduced audio signal output from the audio visual devices by a driver, and for outputting the reproduced audio signal to a front-seat speaker and a rear-seat speaker; video selecting means for arbitrarily selecting one of reproduced video signal output from the audio visual devices by the rear-seat passengers through a rear-seat controller, and for outputting the arbitrarily selected video signal to a display for rear-seat passengers; second audio-selecting means for arbitrarily selecting a reproduced audio signal output from one of the audio visual devices by the rear-seat passengers through the rear-seat controller, or a reproduced audio signal attended on the reproduced video signal outputted from the video selecting means, and for outputting the arbitrarily selected audio signal or the reproduced audio signal to a headphone for the rear-seat passengers; guidance audio visual signal generating means for generating a given guidance audio signal and/or a guidance video signal; operating means for performing an operation by the driver; control means for outputting a first control signal based on what sort of operation is performed by the operating means; and audio signal switching means for temporarily selecting the guidance audio signal in place of the reproduced audio signal selected by the second audio-selecting means, and for outputting the temporarily selected guidance audio signal to the headphone in response to the first control signal, and/or the video signal switching means for temporarily selecting the guidance video signal in place of the reproduced video signal selected by the video selecting means, and for outputting the temporarily selected guidance video signal to the display in response to the first control signal.

Therefore, since the guidance is given by one or both of the voice in the headphone and the video on the display, the driver can make know more clearly his/her own intention.

In an onboard audio visual system comprises a plurality of audio visual devices; first audio-selecting means for selecting one of reproduced audio signals output from the audio visual devices selected by a driver, and for outputting the selected audio signal to a front-seat speaker and a rear-seat speaker; video selecting means for arbitrarily selecting one of reproduced video signals output from the audio visual devices by rear-seat passengers through a rear-seat controller; second audio-selecting means for arbitrarily selecting one of reproduced audio signals output from the audio visual devices by the rear-seat passengers through the rear-seat controller, or a reproduced audio signal attended on the reproduced video signal output from said video selecting means; guidance audio visual signal generating means for generating a given guidance audio signal and a guidance video signal; operating means for performing a predetermined operation; control means for outputting a first control signal based on what sort of operation is performed by the operating means; first audio signal switching means for temporarily selecting the guidance audio signal in response to the first control signal in place of the reproduced audio signal selected by the second audio selecting means; video signal switching means for temporarily selecting the guidance video signal in response to the first control signal in place of the reproduced video signal selected by the video selecting means; audio signal transmitting-receiving means for transmitting and receiving a light signal or a radio wave signal modulated by the audio signal output from the first audio signal switching means, and for outputting the demodulated audio signal to a headphone for the rear-seat passengers; and video signal transmitting-receiving means for transmitting and receiving the light signal or the radio wave signal modulated by the video signal output from the video signal switching means, and for outputting the demodulated video signal to a display for the rear-seat passengers.

Therefore, since the guidance is given by appealing to both the visual and audible senses, the driver can make know more clearly his/her own intention but also this arrangement obviates laying out of the cables because the reproduced audio signals and the reproduced video signals are transmitted by converting them into lights or radio waves, thereby making much more easier the use of the system by the rear-seat passengers.

In an onboard audio visual system of the present invention having a plurality of audio visual devices; a front-seat speaker and a rear-seat speaker for outputting a reproduced audio from said audio visual devices; a headphone for rear-seat passengers for independently outputting a reproduced audio output from one of said audio visual devices arbitrarily selected by the rear-seat passengers through a rear-seat controller, comprises operating means for performing a predetermined operation; control means for outputting, through operation of the operating means, each of control signals having a first period of time T1, a second period of time T1+T2, and a third period of time T2 which appears after an elapse of the first period of time; compression-coding means for compressing and coding a reproduced audio signal output from the audio visual device selected by the rear-seat passengers; audio signal recording means for recording the compressed and coded audio signal in response to the control signal during the second period of time T1+T2; decoding means for reading the compressed and coded audio signal at a high-speed from the audio signal recording means in response to the control signal during the third period of time T2, and for decoding the read audio signal at a high-speed; third audio signal switching means for switching the audio signal at a high-speed in response to the control signal during the third period of time T2 in place of the reproduced audio signal output from the audio visual device; and first signal-attenuating means for attenuating the output signal from the third audio signal switching means, which is sent as an input to said headphone, in response to the control signal during the first period of time T1; wherein the third period of time T2 is set to such a time that a content of the audio signal decoded at a high-speed substantially comes to the same as a present one of the reproduced audio signal output from the audio visual device.

Therefore, since the recorded compression signal is read out at a high-speed and is interpolated, the broadcasting audio can be received without any dropping them and thus the rear-seat passengers do not fail to hear the contents of the broadcasting.

In an onboard audio visual system of the present invention the control means comprises sound field generating means, including, an adaptive filter and a signal attenuator, for outputting a second control signal over a period of time during which a headphone is in use by detecting a state where the output signal from the audio visual device is input to the headphone, and for bringing on a change in a predetermined frequency spectrum of the reproduced audio signal output from one of the audio visual devices so as to supply the changed audio signal to the rear-seat speaker; and fourth audio signal switching means for switching, in response to the second control signal, from the reproduced audio signal directly output from the audio visual device, which is being sent to the rear-seat speaker, to an output signal from the sound field generating means so as to supply the switched signal to the rear-seat speaker.

Therefore, when the driver has something to be sent to the rear-seat passengers, the input signal to the headphone is attenuated by the driver's own operation, thereby facilitating the communication with the rear-seat passengers. In addition, since the middle range components of the driving signal of the rear-seat speaker are suppressed by the sound field generating means, the influence exercised upon the rear-seat passengers is minimized at the time the rear-seat passengers use the headphone and, on the other hand, the driver can listen audio with an appropriate quality. Further, since the frequency components that may interfere with the conversation are suppressed, the reproduced audio in the rear-seat speaker exerts scarcely influence upon the rear-seat passengers even while the driver is communicating with the rear-seat passengers.

In an onboard audio visual system of the present invention the control means further comprises sound field generating means, including an adaptive filter and a signal attenuator, for outputting a second control signal over a period of time during which a headphone is in use by detecting a state where the output signal from the audio visual device is input to the headphone, and for bringing on a change in a predetermined frequency spectrum of the reproduced audio signal output from one of the audio visual devices so as to supply the changed audio signal to the rear-seat speaker; and fourth audio signal switching means for switching, in response to the second control signal, from the reproduced audio signal directly output from the audio visual device, which is being sent to the rear-seat speaker, to an output signal from the sound field generating means so as to supply the switched signal to the rear-seat speaker.

Therefore, when the driver wishes to communicate with the rear-seat passengers, the driver can make know more clearly his/her own intention by inputting in advance the calling signal to the headphone of the rear-seat passengers. In addition, since the middle audio components of the driving signal of the rear-seat speaker is suppressed by the sound field generating means, the influence exercised upon the rear-seat passengers is minimized at the time the rear-seat passengers use the headphone and the driver, on the other hand, can listen audio with an appropriate quality. Further, since the frequency components that may interfere with the conversation are suppressed, the reproduced audio of the rear-seat speaker exerts hardly influence upon the rear-seat passengers even while the driver is communicating with the rear-seat passengers.

In a onboard audio visual system of the present invention the control means further comprises sound field generating means, including an adaptive filter and a signal attenuator, for outputting a second control signal over a period of time during which a headphone is in use by detecting a state where the output signal from the audio visual device is input to the headphone, and for bringing on a change in a predetermined frequency spectrum of the reproduced audio signal output from one of the audio visual devices so as to supply the changed audio signal to the rear-seat speaker; and fourth audio signal switching means for switching, in response to the second control signal, from the reproduced audio signal directly output from the audio visual device, which is being sent to the rear-seat speaker, to an output signal from the audio field generating means so as to supply the switched signal to the rear-seat speaker.

Therefore, when the driver has something to be sent to the rear-seat passengers, the driver's voice is transmitted to the rear-seat passenger's headphone through the transmitting microphone of the hand-free automobile telephone. Thus, better communication between the driver and the rear-seat passengers is attained. In addition, since the middle range components of the driving signal of the rear-seat speaker are suppressed by the sound field generating means, the influence exercised upon the rear-seat passengers is minimized at the time the rear-seat passengers uses the headphone and the driver can listen audio with an appropriate quality. Still further, since the frequency components that may interfere with the conversation are suppressed, the reproduced audio of the rear-seat speaker exerts scarcely influence upon the rear-seat passengers even while the driver is communicating with the rear-seat passengers.

In an onboard audio visual system of the present invention the control means further comprises sound field generating means, including an adaptive filter and a signal attenuator, for outputting a second control signal over a period of time during which a headphone is in use by detecting a state where the output signal from the audio visual device is input to the headphone, and for bringing on a change in a predetermined frequency spectrum of the reproduced audio signal output from one of the audio visual devices so as to supply the changed audio signal to the rear-seat speaker; and fourth audio signal switching means for switching, in response to the second control signal, from the reproduced audio signal directly output from the audio visual device, which is being sent to the rear-seat speaker, to an output signal from the sound field generating means so as to supply the switched signal to the rear-seat speaker.

Therefore, since the guidance can be given by the audio via the headphone and by the video on the display, the driver can make know more clearly his/her own intention. In addition, since the middle range components of the driving signal for the rear-seat speaker are suppressed by the sound field generating means, the influence exercised upon the rear-seat passengers is minimized at the time the rear-seat passengers uses the headphone. On the other hand, the driver can listen audio with an appropriate quality. Still further, since the frequency components that may interfere with the conversation are suppressed, the reproduced audio from the rear-seat speaker exerts hardly influence upon the rear-seat passengers while the driver is communicating with the rear-seat passengers.

In an onboard audio visual system of the present invention having a plurality of audio visual devices; a front-seat speaker and a rear-seat speaker for outputting reproduced audio from the audio visual devices; a headphone for rear-seat passengers for independently outputting a reproduced audio from one of the audio visual devices arbitrarily selected by the rear-seat passengers through a rear-seat controller, comprises control means for outputting a second control signal over a period of time during which the headphone is in use by detecting a state where an output signal from the audio visual device is input to the headphone; sound field generating means, including an adaptive filter and a signal attenuator, for outputting a second control signal over a period of time during which a headphone is in use by detecting a state where the output signal from the audio visual device is input to the headphone, and for bringing on a change in a predetermined frequency spectrum of the reproduced audio signal output from one of said audio visual devices so as to supply the changed audio signal to the rear-seat speaker; and fourth audio signal switching means for switching, in response to the second control signal, from the reproduced audio signal directly output from the audio visual device, which is being sent to the rear-seat speaker, to an output signal from the sound field generating means so as to supply the switched audio signal to the rear-seat speaker.

Therefore, since the middle range components of the driving signal of the rear-seat speaker are suppressed by the sound field generating means, the influence exercised upon the rear-seat passengers is minimized at the time the rear-seat passengers use the headphone and the driver, on the other hand, can listen audio with an appropriate quality. In addition, since the frequency components that may influence upon the conversation are suppressed, the reproduced audio of the rear-seat speaker exerts hardly influence upon the rear-seat passengers even while the communication.

In an audio-visual device of the present invention the control means is arranged on an operating display panel of the audio visual device so as to make operating functional buttons of other devices serve a double purpose.

Therefore, the space for installing the operating panel as well as the cost are reduced.

BRIEF DESCRIPTION OF THE DRAWINGS

FIG. 11 is a circuit diagram showing the onboard audio visual system and a switching circuit applied to fifth through seventh embodiments according to the invention.

FIG. 12 is an external view of an operation displaying panel having a front-seat controller positioned in front of the main component showing an eight embodiment.

BEST MODE FOR CARRYING OUT THE INVENTION

Hereinafter, the best mode for carrying out the invention will be described in detail with reference to the accompanying drawings.

First Embodiment

Figure 2:
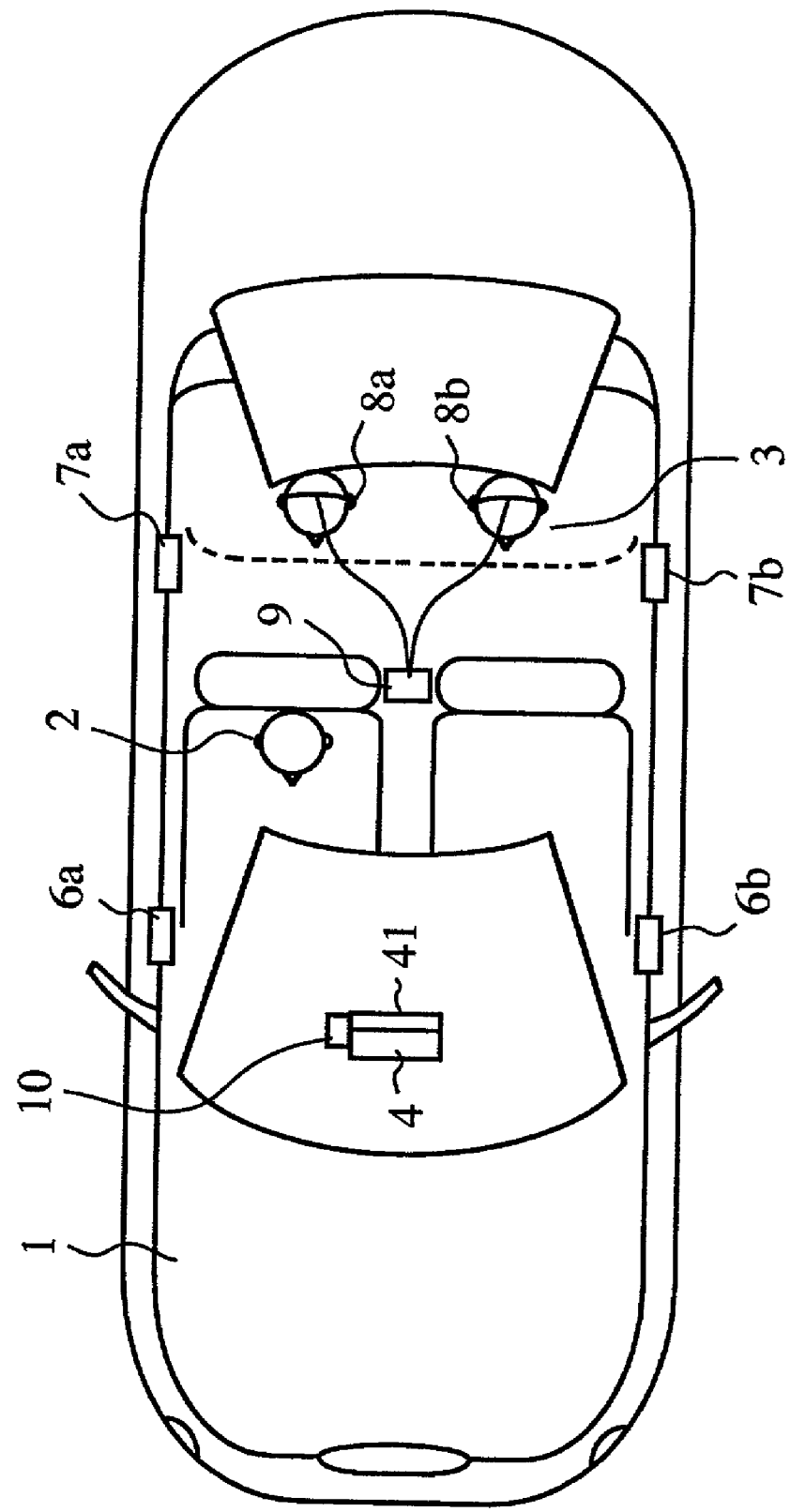
FIG. 2 is a bird's eye view illustrating a schematic arrangement inside a motor vehicle of first through fourth embodiments of the onboard audio visual system according to the invention.

FIG. 2 is a bird's eye view illustrating a schematic arrangement inside a motor vehicle of first through fourth embodiments of the onboard audio visual system according to the invention.

Referring to FIG. 2, reference numeral 1 denotes the main body of a motor vehicle, reference numeral 2 a driver, and reference numeral 3 rear-seat passengers. Reference numeral 4 denotes the main component of an onboard (vehicle-mounted) audio visual system, which incorporates therein a plurality of appropriate number of audio visual devices such as an FM/AM tuner, a cassette tape recorder, an MD player, a solid player, a DVD player, a television (TV) tuner, or the like, as well as a selecting circuits to select out of the above for reproducing them, other necessary functional circuits, or the like. Reference numerals 6a, 6b denote a pair of left and right front-seat speakers disposed on the front seat side inside the motor vehicle. Reference numerals 7a, 7b denote rear-seat speakers disposed on the rear seat side. Reference numerals 8a, 8b denote headphones for use by the rear-seat passengers. Reference numeral 9 denotes a rear-seat controller for the rear-seat passengers to independently operate the audio visual devices. Reference numeral 41 denotes a front-seat controller for performing an operation by the driver or a front-seat passenger, or a front operation panel for the main component 4. Reference numeral 10 denotes an operating means disposed near the driver 2 as one of the components of this invention.

In this kind of onboard audio visual system, the driver 2 utilizes the audio visual system by operating the front-seat controller 41. For example, the driver listens to the FM/AM tuner or the DVD audio. On the other hand, the rear-seat passengers 3 are able to listen, if necessary, to the reproduced audio output from a sound source different from that (FM radio) which the driver 2 is now listening to, by using the rear-seat controller 9. At this time, however, the rear-seat passengers 3 are given a mere opportunity to listen to the audio visual device selected by themselves only with the headphones 8a, 8b.

Figure 1:
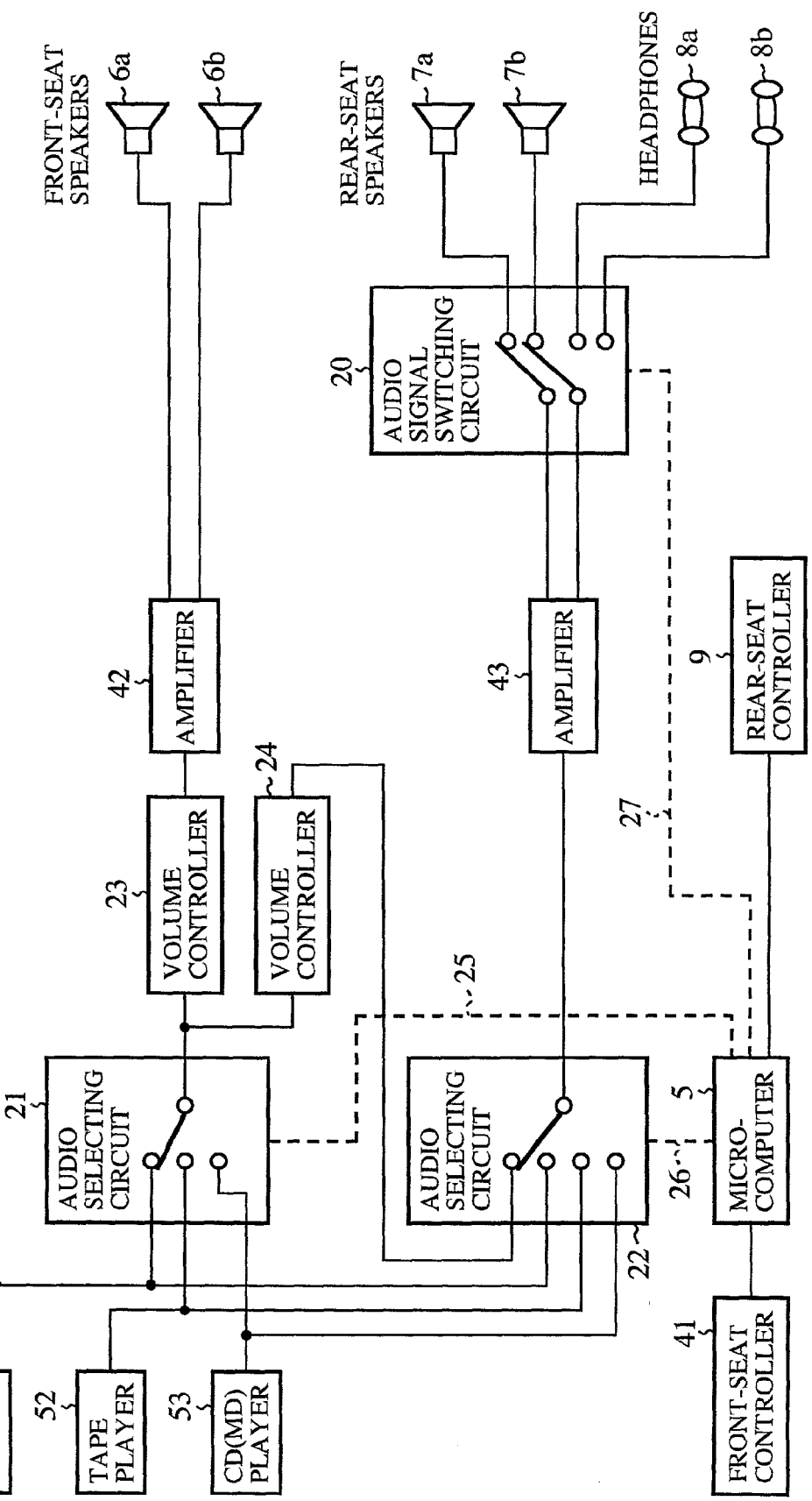
FIG. 1 is a circuit diagram showing a circuit configuration of a conventional onboard audio visual system.
Figure 3:
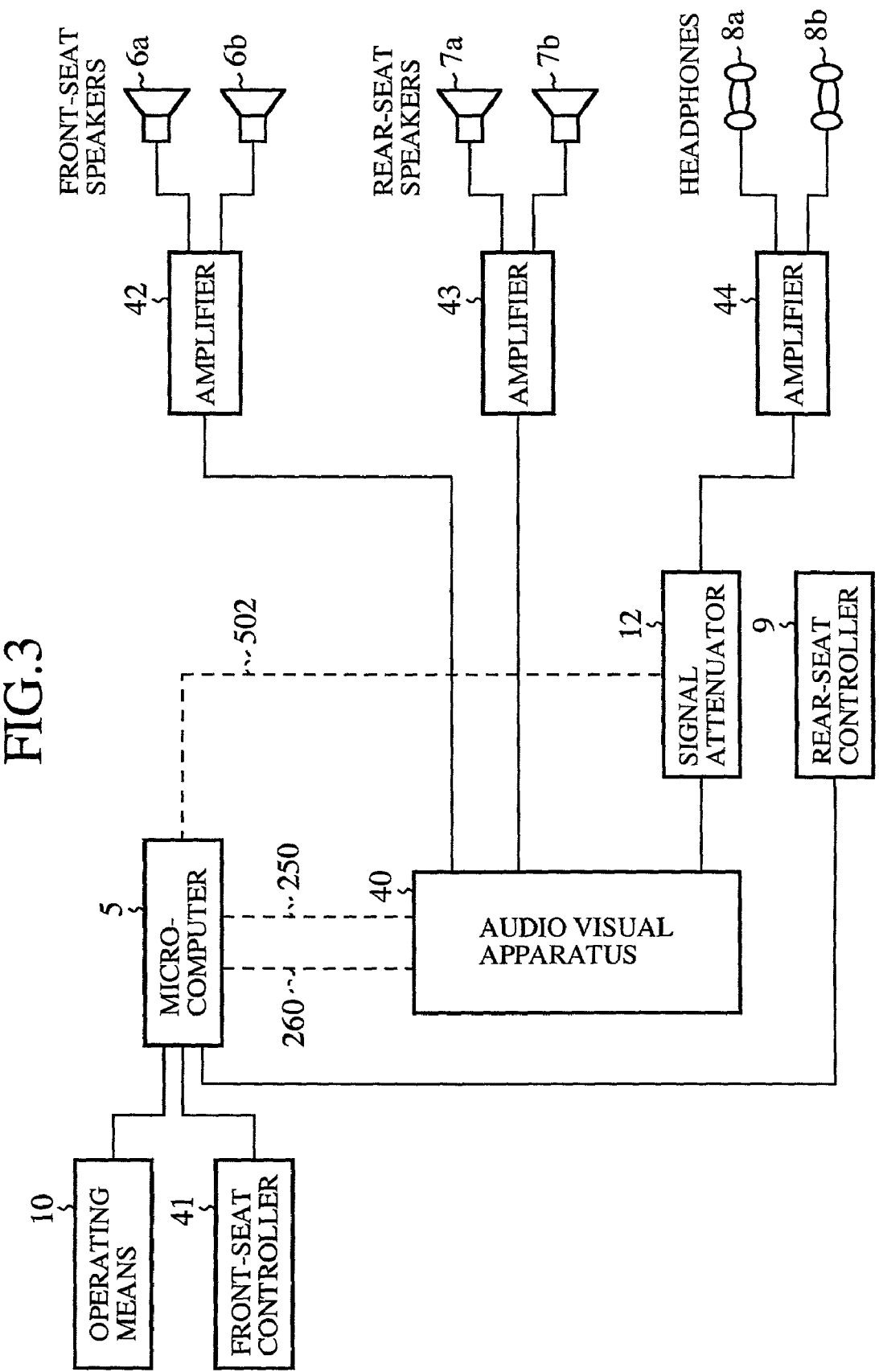
FIG. 3 is a circuit diagram showing a first embodiment.

FIG. 3 is a circuit diagram showing a first embodiment. In FIG. 3, the same components as those in FIGS. 1 and 2 are denoted by the same reference numerals.

Referring to FIG. 3 reference numeral 40 denotes an audio visual apparatus representing the various audio visual devices and their selecting circuits mounted inside the main component 4, and yet it serves as a signal source from which reproduced audio signals to be sent to the front-seat speakers 6a, 6b, to the rear-seat speakers 7a, 7b, and to the rear-seat headphones 8a, 8b are selectively outputted. The microcomputer 5 as a control means generates control signals to control the audio visual apparatus 40 or to operate a signal attenuator 12 by receiving a command signal from the controllers 9, 41 and the operating means 10. The signal attenuator 12 as a first signal attenuating means attenuates, by the operation below, the reproduced audio signal to be inputted into the rear-seat headphones 8a, 8b. The amplifier 42 drives the front-seat speakers 6a, 6b, the amplifier 43 the rear-seat speakers 7a, 7b, and an amplifier 44 the headphones 8a, 8b by respectively supplying reproduced audio signals.

The operation of the circuit in FIG. 3 will then be described.

When the microcomputer 5 receives a command signal by the operation of the front-seat controller 41, an audio selecting signal is sent to the block 40 through a signal line 250 shown in a dotted line. Then, a reproduced audio signal selected from the audio visual devices mounted inside the audio visual apparatus 40 is outputted to the front-seat speakers 6a, 6b and the rear-seat speakers 7a, 7b. When the rear-seat controller 9 is operated, an audio selecting signal is sent from the microcomputer 5 to the audio visual apparatus 40 through a signal line 260, so that the reproduced signal to be outputted to the headphones 8a, 8b is selected. In this case, the reproduced audio from the audio visual device to be selected by the rear-seat controller 9 is outputted independent of the ones to be sent to the speakers 6a, 6b, 7a, 7b. For example, when the front-seat speakers 6a, 6b and the rear-seat speakers 7a, 7b are operated by the received audio signal sent from a radio broadcasting station, the headphones 8a, 8b can also be operated at the same time by the reproduced audio signal from the cassette tape. In addition, the microcomputer 5 outputs a control signal of a temporary length to the signal attenuator (a first signal attenuating means) 12 through a signal line 502.

In case of necessity, under an emergency or some other circumstances, for the driver to communicate with the rear-seat passengers 3 who are listening to the headphones, the driver operates the operating means 10 mounted in the neighborhood of the driver. Then, the microcomputer 5 recognizes that the operating means 5 is operated and outputs, as a control signal, an attenuation factor setting signal which commands the signal attenuator 12 to execute an attenuation of 10 dB or more as compared with that at an ordinary time. As a result, the reproduced volume of the headphones 8a, 8b abruptly toned down.

Consequently, the rear-seat passengers 3 notice the abrupt lowering of the volume and provokes the driver's attention or puts off the headphones 8a, 8b from their ears to have communication with the driver 2. The attenuation factor of the signal attenuator 12 may only have a level which is enough to notify others that the volume abruptly toned down. Alternatively, of course the volume may be lowered to zero.

Second Embodiment

Figure 4:
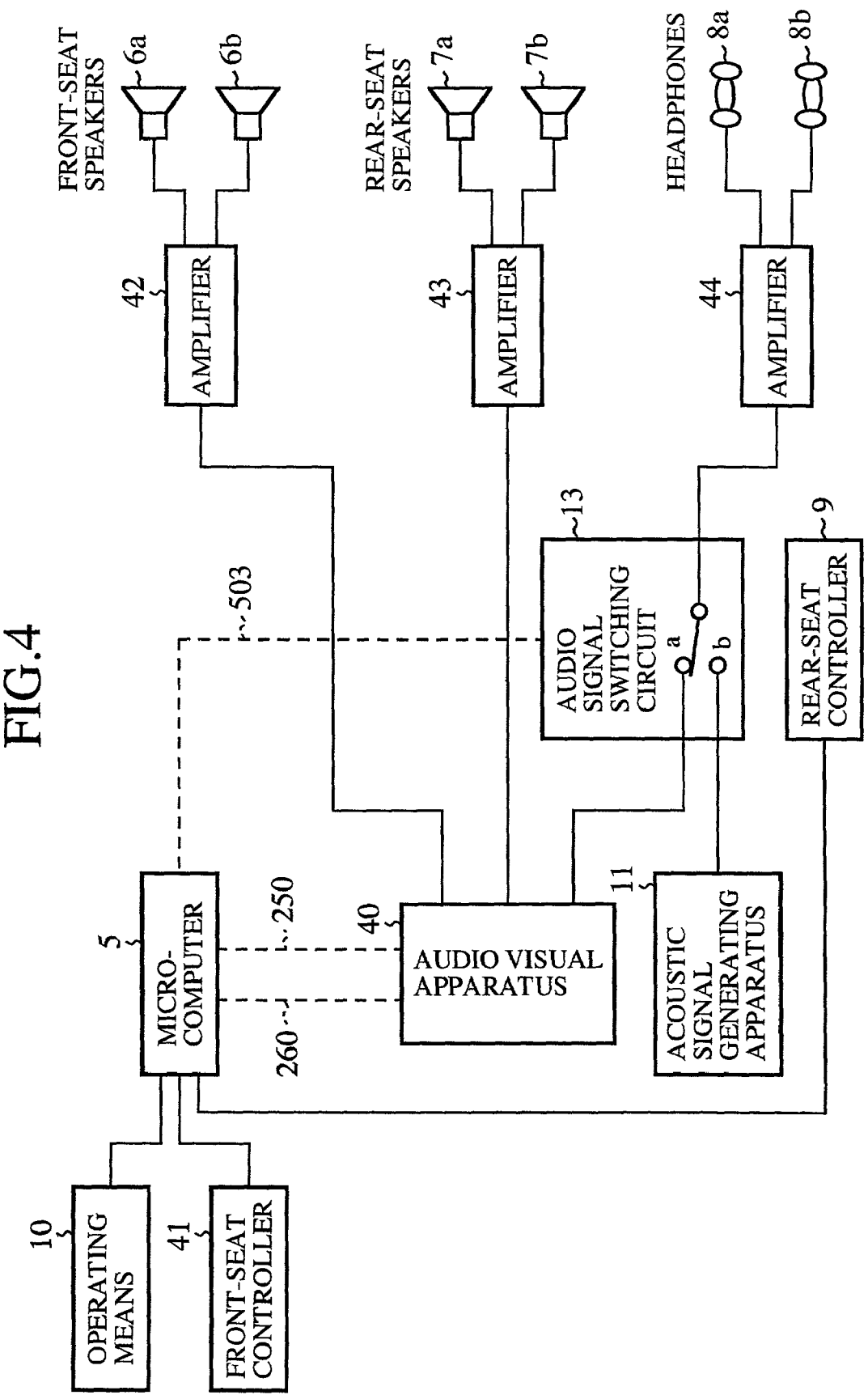
FIG. 4 is a circuit diagram showing a second embodiment.

FIG. 4 is a circuit diagram showing a second embodiment. The circuit in FIG. 4 differs from that in FIG. 3 in that an audio signal switching circuit (first audio signal switching means) 13 is provided instead of the signal attenuator 12, and in that an acoustic signal generating apparatus 11 is further added.

The acoustic signal generating apparatus (an acoustic signal generating means) 11 is an apparatus for generating a calling signal to attract person's attention. As a calling sound, a buzzer sound, melody signal sound, a guidance sound generated by synthesized sound ("put off the headphone" for example), or the like is used. When the audio signal switching circuit 13 receives a temporary control signal from the microcomputer 5 through a signal line 503, it is switched from the side "a" of the reproduced signal of the audio visual device mounted inside the block 40 to the side "b" of the calling signal. Therefore, during this period, the calling sound is outputted from the headphones 8a, 8b.

Therefore, when the driver 2 is driven by necessity under which he/she must have communication with the rear-seat passengers 3, the reproduced audio from the audio visual device is shut off by operating the operating means 10 and, instead, the calling sound is sent to the rear-seat passengers 3. Thus, the driver can make know more clearly his/her own intention to hold a conversation with the rear-seat passengers.

Third Embodiment

Figure 5:
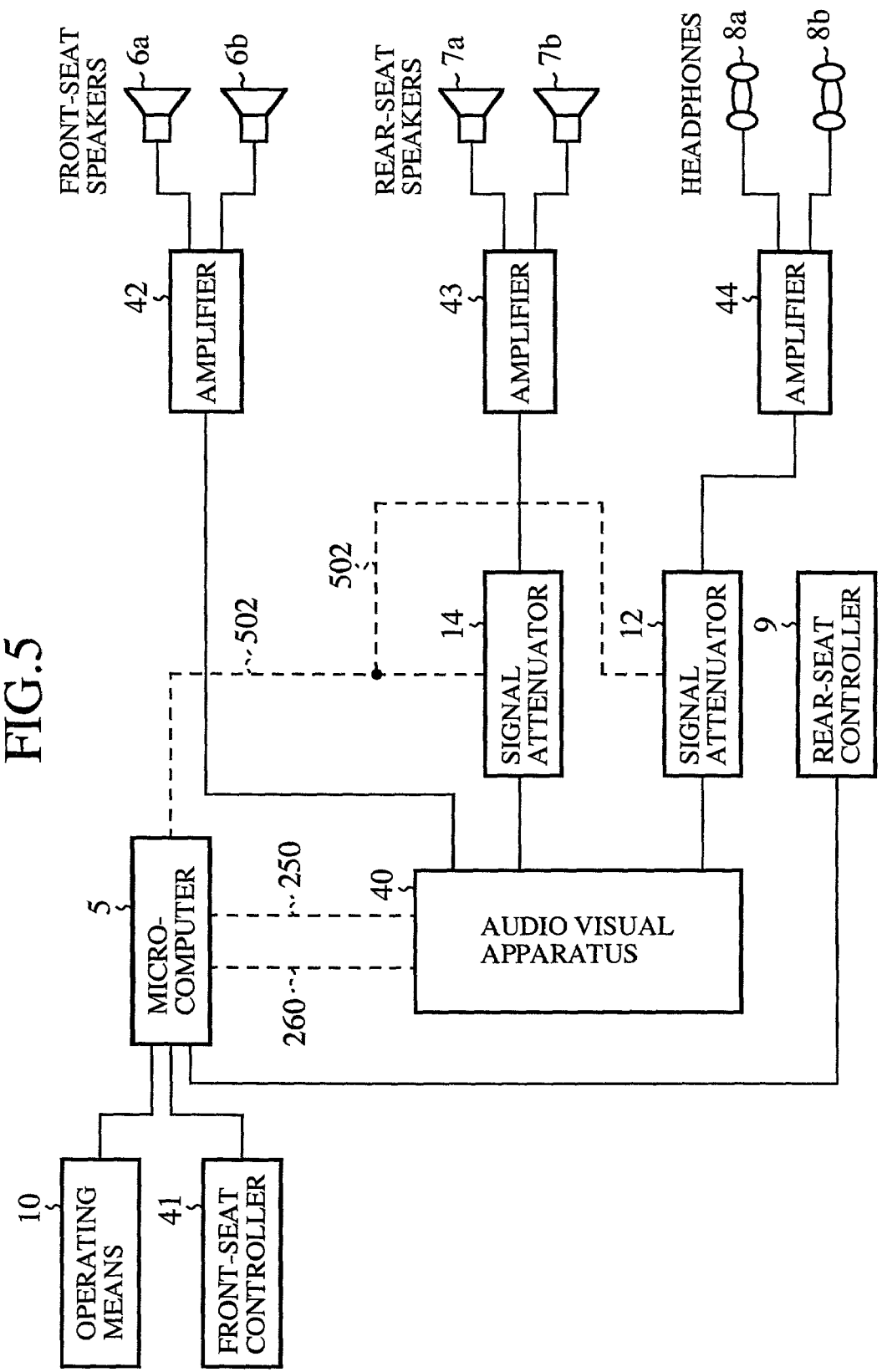
FIG. 5 is a circuit diagram showing a third embodiment.

FIG. 5 is a circuit diagram showing a third embodiment. In this third embodiment a signal attenuator (a second signal attenuating means) 14 for attenuating the audio signal to be applied to the rear-seat speakers 7a, 7b is further added in FIG. 3. Like the signal attenuating device 12, the attenuation factor setting signal is temporarily supplied, as a control signal, to the signal attenuating device 14 from the microcomputer 5 through the signal line as shown by the dotted line 502.

Therefore, the driver 2, if necessary, can attenuate not only the audio signal sent to drive the headphones 8a, 8b but also that sent to the rear-seat speakers 7a, 7b. Thus, by lowering the reproduced volume of the rear-seat speakers 7a, 7b, the rear-seat passengers 3 are able to recognize the abrupt lowering of the volume of the headphones 8a, 8b without being influenced on the audible senses.

Fourth Embodiment

Figure 6:
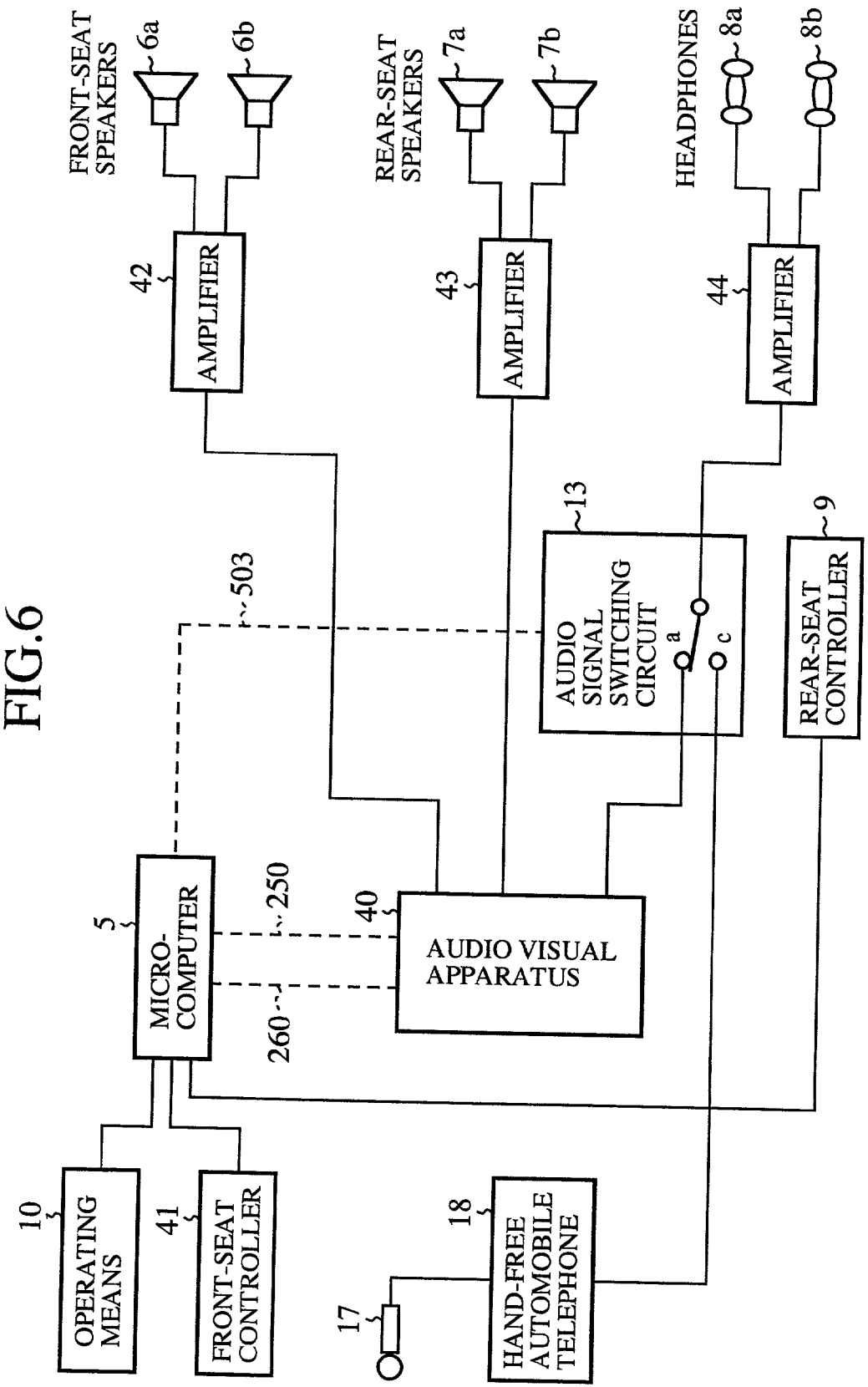
FIG. 6 is a circuit diagram showing a fourth embodiment 4.

FIG. 6 is a circuit diagram showing a fourth embodiment. There is shown in the fourth embodiment a case where a hand-free automotive telephone which enables the driver relatively easy use of a transmitting microphone is mounted in the motor vehicle. In FIG. 6, what is different from FIG. 4 is in that, in place of the acoustic signal generating apparatus 11, the hand-free automotive telephone 18 having a transmitting microphone 17 is added.

Referring to FIG. 6, when the driver 2 tries to communicate with the rear-seat passengers 3 who are putting on the headphones 8a, 8b, the driver operates the operating means 10. Then, a control signal is sent from the microcomputer 5 to the audio signal switching circuit 13 through a line 503, thereby switching the audio signal switching circuit 13 from the output side "a" of the audio visual device to the transmitting side "c" of the transmitting microphone 17. As a result, although the reproduced audio output from the audio visual device is shut off, the voice of the driver 2 is reproduced, instead, in the headphones 8a, 8b for transmitting to the rear-seat passengers 3.

Here, the control signal from the microcomputer 5 controls the audio signal switching circuit 13 so as to leave the second signal switching circuit 13 switched to the transmitting side "c" for the period of time necessary for the operation of the operating means 10. However, the busy state may sometimes be prolonged and, therefore, once the hand is inadvertently left off the operating means 10, the control period will be finished on the way of communication. In order to avoid such a shortcoming, an output indicative of the busy state of the line is sent from the hand-free automobile telephone 18 to the microcomputer 5. The control signal is continuously sent so that the switched state of the switching circuit 13 can be held for the whole period of the busy state.

Fifth Embodiment

Figure 7:
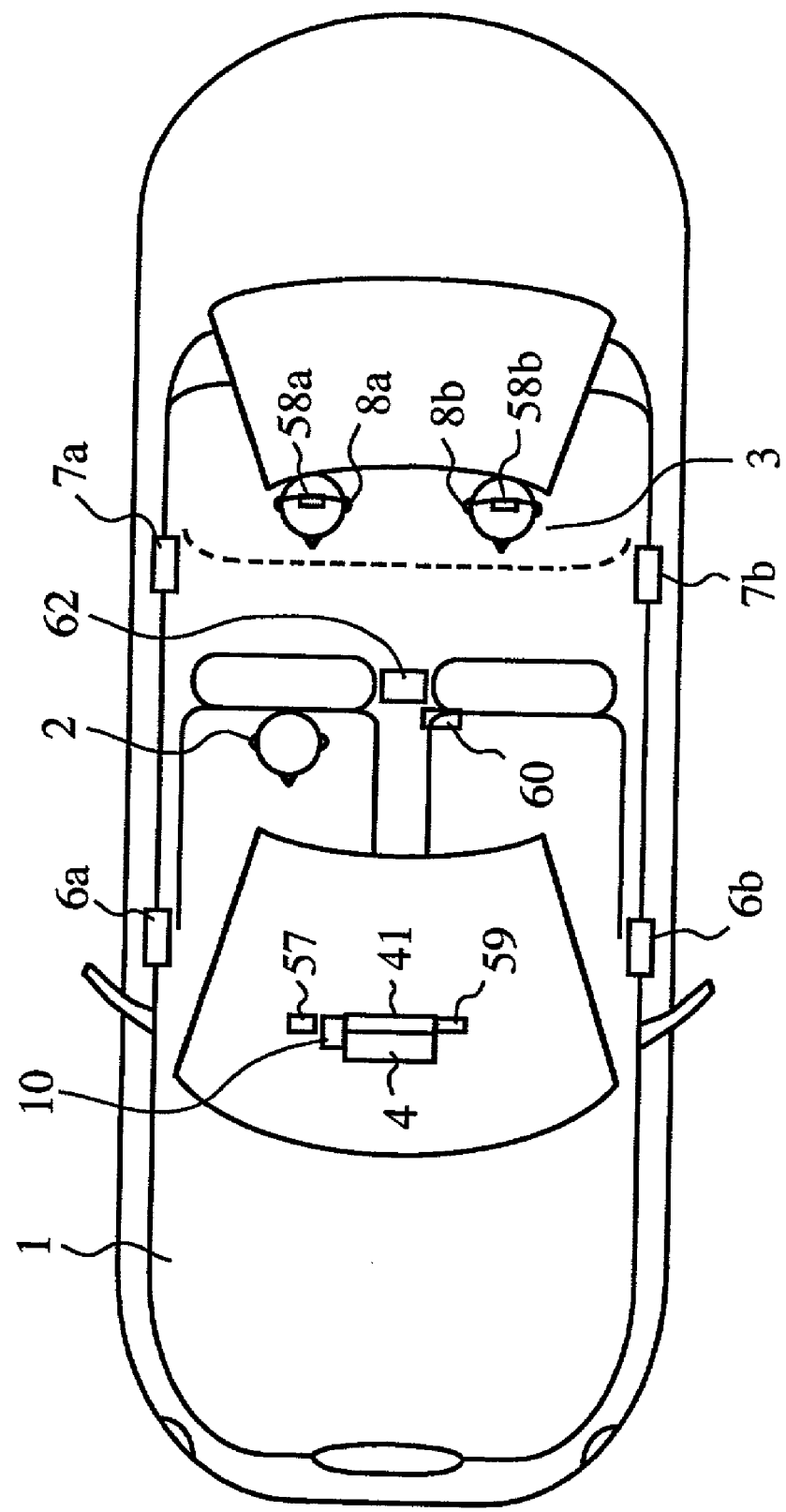
FIG. 7 is a bird's eye view illustrating fifth through seventh embodiments of the onboard audio visual system according to the invention.
Figure 8:
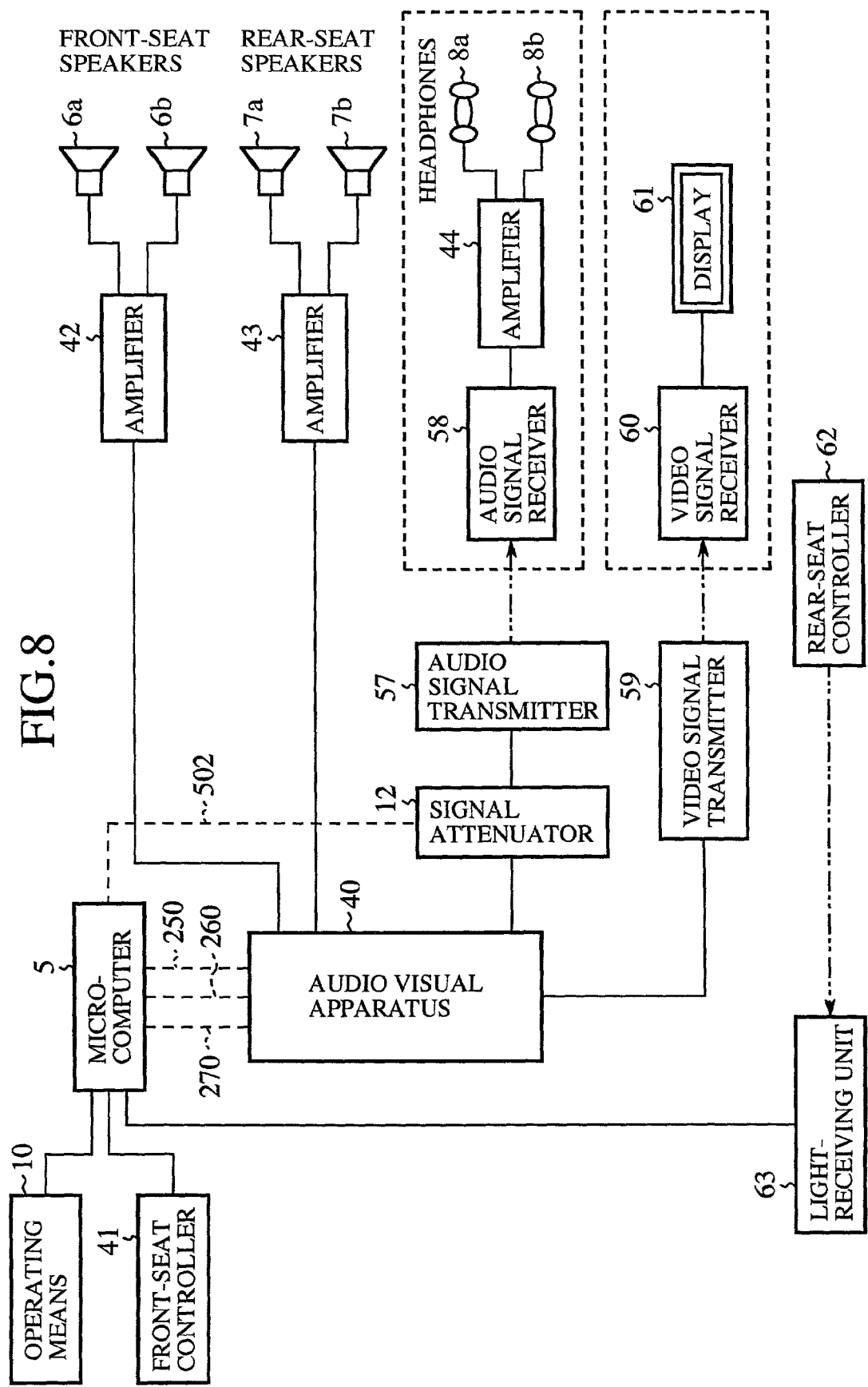
FIG. 8 is a circuit diagram showing a fifth embodiment.

FIG. 7 is a bird's eye view illustrating fifth through seventh embodiments of the onboard audio visual system according to the invention. FIG. 8 is a circuit diagram showing a fifth embodiment. In FIG. 7 a schematic arrangement inside a motor vehicle is shown, and in FIG. 11 the onboard audio visual system and a switching circuit therefor mounted inside the audio visual apparatus 40 is shown.

Here, the onboard audio visual systems according to fifth though seventh embodiments are embodiments for providing means for solving the problem arisen in utilizing the audio signal and the video signal by transmitting them to the rear seats, as well as that concerning the restriction on the laying out of cables between the front seats and the rear seats and facilitation of the system by the rear-seat passengers.

In FIG. 7, what is different from the above FIG. 2 is in that there are provided an audio signal transmitter 57 and a video signal transmitter 59 disposed on the front seat side close to, or integral with, the main component 4; and audio signal receivers 58a, 58b mounted on the headphones 8a, 8b on the rear seat side, and a video signal receiver 60 disposed adjacent to, or integral with, a rear-seat controller 62. The rear-seat controller 62 is a controller for performing infrared-ray transmission and reception of command signals to and from a light-receiving unit 63 (FIG. 8) assembled into the front-seat controller 41. The main component 4 incorporates therein audio visual devices as shown in FIG. 11 such as an FM/AM tuner 51, a cassette tape player 52, an MD player 53, a solid state player 54, a DVD player 55, a TV tuner 56, or the like; audio selecting circuits 47, 48; a video selecting circuit 49; and other necessary circuits.

In FIGS. 8 and 11, the audio selecting circuit (the first audio selecting means) 47 is a circuit for selecting the sound source of a medium which the driver 2 wishes. It is controlled by the audio selecting signal to be sent through the signal line 250 of the microcomputer 5, and its output is sent to the drive amplifiers 42, 43 for the front-seat speakers 6a, 6b and the rear-seat speakers 7a, 7b, respectively. The audio selecting circuit (the second audio selecting means) 48 is a circuit for selecting the sound source of a medium required by the rear-seat passengers 3. It is controlled by the audio selecting signal through the signal line 260 of the microcomputer 5. Its output is sent to the audio signal transmitter 57 through the signal attenuator 12. The inputted audio signal is propagated through space in the form of light or a radio wave via the audio signal transmitter 57. This propagated signal received by the audio signal receiver 58 is demodulated into an electric signal, and is sent to the headphones 8a, 8b through the amplifier 44 to drive the headphones. Here, the audio signal receiver 58 and the amplifier 44 are integrated with the headphones 8a, 8b. The audio signal transmitter 57 and the audio signal receiver 58 constitute an audio signal transmitting-receiving means.

The video selecting circuit (the video selecting means) 49 is a circuit for selecting one required by the rear-seat passengers 3 from the video media such as the DVD player 55, the TV tuner 56, or the like. It is controlled by the video selecting signal sent through a signal line 270 of the microcomputer 5. Naturally, the audio selecting circuit 48 selects the audio signal in synchronization with the reproduced video signal attended on the reproduced video signal by the video selecting circuit 49. The selected reproduced video signal selected is sent to the video signal transmitter 59. After the signal is transmitted through space in the form of the light or the radio wave in the same way as the audio signal, it is received by the video signal receiver 60 and is demodulated into an electric signal for video reproduction by a display 61. The video signal receiver 60 is integrated with the display 61. The video signal transmitter 59 and the video signal receiver 60 constitute a video signal transmitting-receiving means.

The rear-seat controller 62 is a wireless type which transmits the command signal for the rear-seat controller 9, as described in the first embodiment, after converting it to the infrared ray signal. The infrared ray signal transmitted from this rear-seat controller 62 is received by the light-receiving unit 63 disposed in the front-seat controller 41, and is demodulated into an electric signal for transmitting it to the microcomputer 5.

Suppose that the driver 2 has faced a necessity for communication with the rear-seat passengers 3 while they are listening to, and watching at, the reproduced DVD video by means of the display 61 and the headphones 8a, 8b. When the driver 2 operates the operating means 10, the reproduced audio signal attended on the video is temporarily attenuated by the signal attenuator 12 which responds to the control signal of the microcomputer 5. The signal having the attenuated component is converted by the audio signal transmitter 57 to the space-propagating signal carried by the light or the radio wave. Thus transmitted signal in this manner is in turn received by the audio signal receiver 58 disposed in the rear-seat headphones 8a, 8b and is demodulated into an audio signal. Thus demodulated audio signal is applied to the headphones 8a, 8b through the amplifier 44 to drive the headphones.

As a consequence, the rear-seat passengers 3 recognize that the volume of the headphones 8a, 8b abruptly toned down and provokes the driver's attention, thereby facilitating communication between them.

Therefore, there is no need of laying out cables between the main component 4 in the front seat and the devices used in the rear seat. Thus, this alleviates the conditions for disposing the display 61. In addition, the rear-seat passengers 3 put on the headphones 8a, 8b are free to move their bodies while listening to audio without being obstructed by the cables. As a result, the use of the headphones is made much easier because they can take a relaxed posture.

Further, by adoting the rear-seat controller 9 in a wireless, the controller 9 will not become an obstruction and rather is convenient in using it even if it is left beside the rear-seat passengers, as a prompt action can be taken in the course of operation of the system.

Sixth Embodiment

Figure 9:
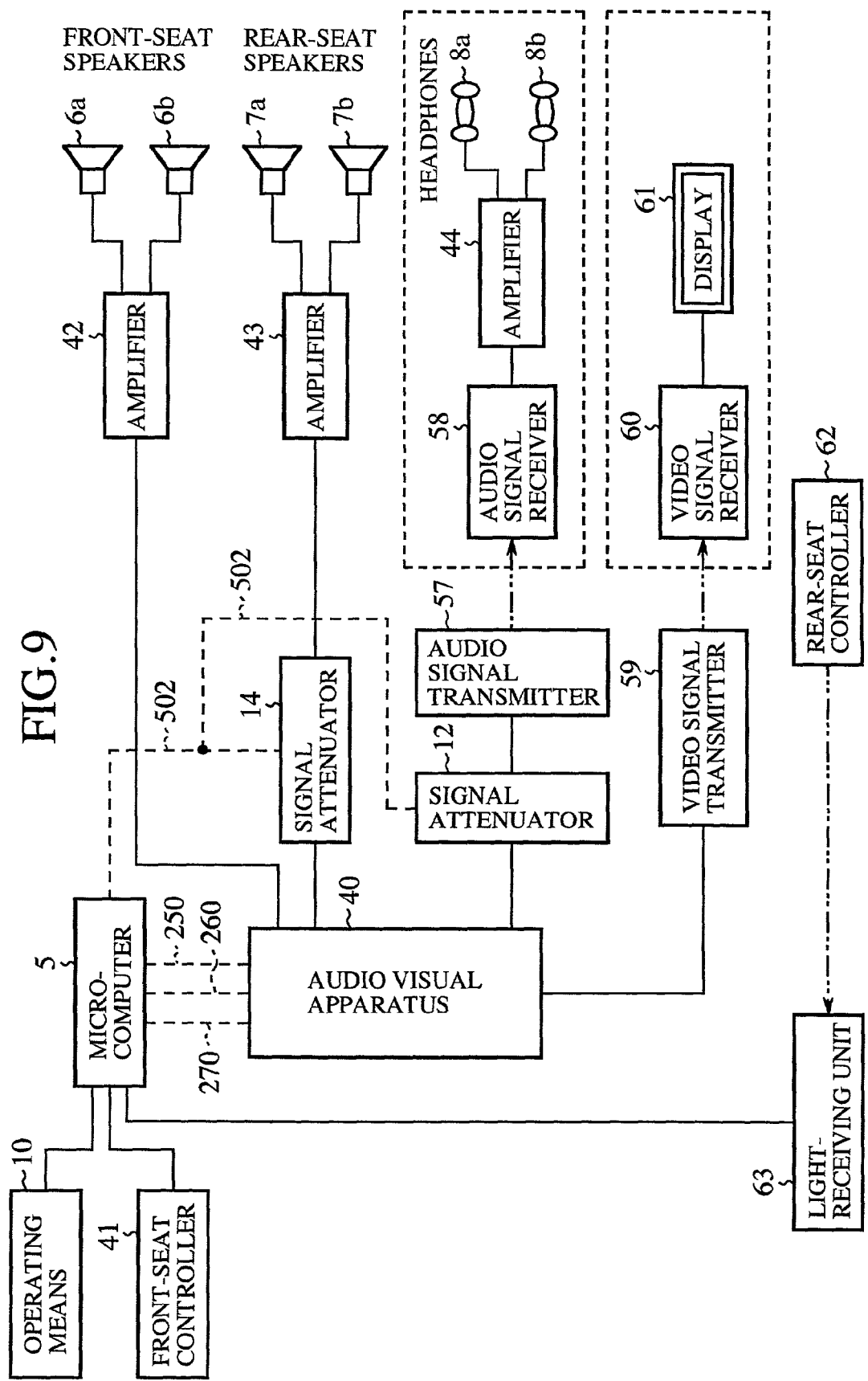
FIG. 9 is a circuit diagram showing a sixth embodiment.

FIG. 9 is a circuit diagram showing a sixth embodiment. In this sixth embodiment, a signal attenuator 14 is newly added for attenuating the audio signal for the rear-seat speakers 7a, 7b in FIG. 8.

In FIG. 9, depending on what sort of operation is performed by the operating means 10, the reproduced signal sent to the headphones 8a, 8b is attenuated by the signal attenuator 12, as well as the reproduced audio signal sent to the rear-seat speakers 7a, 7b is also temporarily attenuated by the signal attenuator 14.

Therefore, although the reproduced volume of the rear-seat speakers 7a, 7b to which the driver 2 is listening to becomes lower, the rear-seat passengers 3 make sure to recognize lowering in the volume of the headphones 8a, 8b. In addition, by adopting the system in a wireless, further improvement in convenience is expected.

Seventh Embodiment

Figure 10:
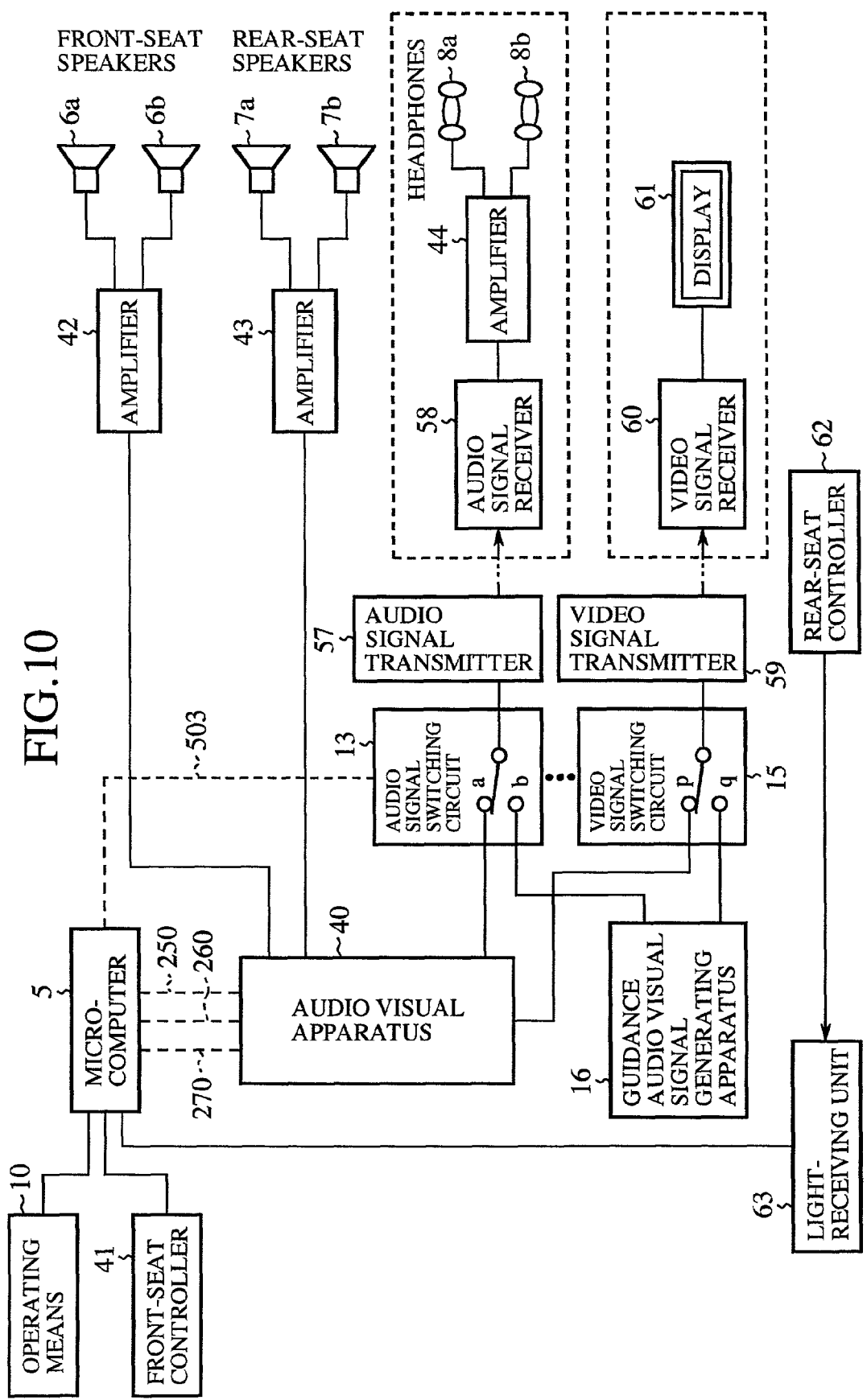
FIG. 10 is a circuit diagram showing a seventh embodiment.

FIG. 10 is a circuit diagram showing a seventh embodiment. In this tenth embodiment, an audio signal switching circuit 13 is added in place of the signal attenuator 12, and a video signal switching circuit (a video signal switching means) 15 and a guidance audio visual signal generating apparatus (a guidance audio visual signal generating means) 16 are further added in FIG. 8.

The guidance audio visual signal generating apparatus 16 is an apparatus for generating a guidance video representative of a text, a pictorial representation, or the like to provoke person's attention, aside from a guidance signal sound to excite person's attention such as a signal sound by means of a buzzer sound, a melody signal sound, a synthesized sound (for example, "please put off your headphone"), or the like.

In FIG. 10, when a control signal output from the microcomputer 5 is received, the audio signal switching circuit 13 is switched from the audio reproducing signal side "a" of the block 40 to the guidance sound signal side "b" of the guidance audio visual signal generating apparatus 16 over the whole period of time of the control signal. At the same time, the video signal switching circuit 15 is switched from the reproduced video signal side "p" of the block 40 to the guidance video signal side "q."

By taking such a configuration, the rear-seat passengers 3 who are listening to the headphones 8a, 8b receive the message from the driver 2 by both in audio and video, so that a secure communication can be had. In addition, it is needless to say that the use of the system by the rear-seat passengers 3 is made much easier owing to the wireless system.

As a modified example of this embodiment, a circuit configuration may be adopted, in which either the guidance video or the guidance sound is switched. In such a configuration, however, the audio visual signal generating apparatus 16 may be arranged to generate only the guidance sound signal and the guidance video signal.

Eight Embodiment

FIG. 12 is an external view of an operation displaying panel showing an eight embodiment. The operating panel is provided with a front-seat controller 41 positioned in the front side of the main component 4, on which inserting openings for inserting a DVD, a CD, an MD, a cassette tape, a memory card, or the like; an operating state indicator; various operating buttons, or the like are provided. Here, there is a button caved as "traffic information" for example. This button is operated by the driver 2 who is listening to the radio when the driver wishes to receive the broadcasting signal for the traffic information, and this button is well known. In this embodiment, this kind of existing operating button 10 is used for making the operating means 10 for communicating with the rear-seat passengers 3 who are listening to the headphones 8a, 8b serve a double purpose. There are some buttons in which a measure has been taken in the circuit to prevent the communication in a state where the headphones 8a, 8b are not in use.

By taking such an arrangement, the limited area of the main component 4 can be effectively utilized with a reduced cost.

In the first through third embodiments and fifth through seventh embodiments, the timing of bringing on a change in the input signal to the headphones 8a, 8b at the time attempting the communication, i.e., the time of control signal of the microcomputer 5 is generated by specific methods as described below.

Figure 13:
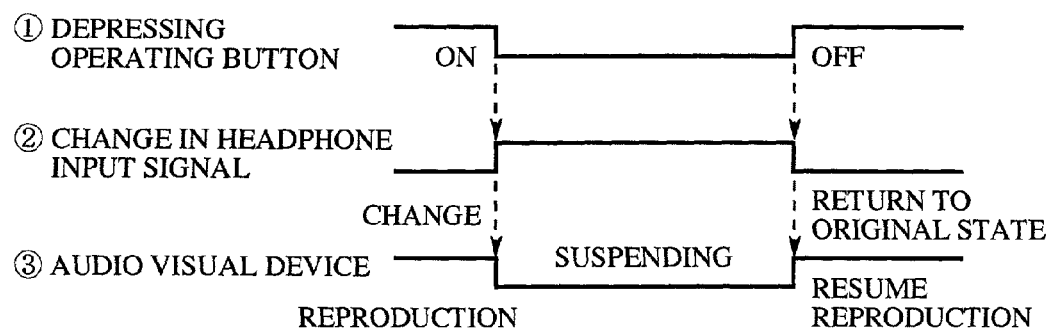
FIG. 13 is a timing chart showing an operation.

One of them is shown in a timing chart in FIG. 13. Referring to the timing chart period ① during which the button of the operating means 16 is depressed, i.e., a signal having a time coinciding with that during which the button switch is held active, thereby bringing on a change ② in the input signal to the headphones 8a, 8b. Although no reference has been made so far, the operation ③ of the audio visual device reproducing the package medium such as the CD, the DVD, or the like mounted inside the main component 4 may also be suspended. Then, at the timing on which the finger is left away from the button, the input signal to the headphones 8a, 8b returns to the original state. At this time, the operation ③ of the audio visual device will be released from the suspended state and resumed.

Figure 14:
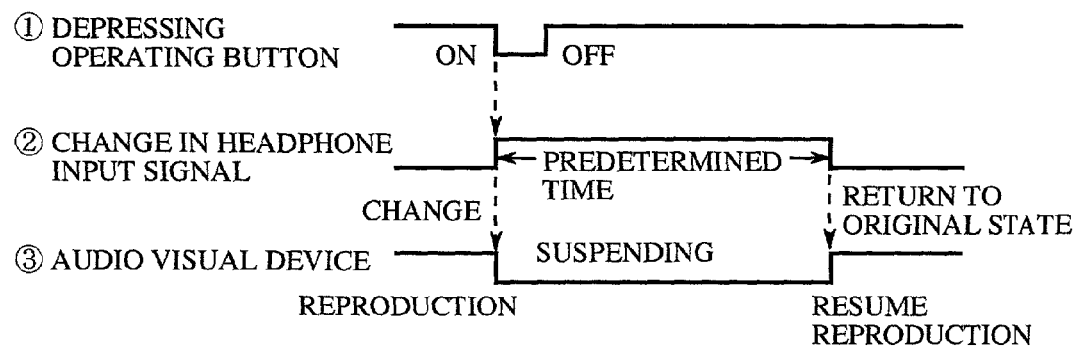
FIG. 14 is a timing chart showing an operation.

Another method is shown in the timing chart in FIG. 14. A timer generates a predetermined time starting from the time where the operating switch is depressed ①, and a control signal having a predetermined period of time is generated, thereby bringing on a change ② in the input signal to the headphones 8a, 8b. At the same time, the operation ③ of the audio visual device under reproduction is suspended. After an elapse of the predetermined time, the headphone returns to the original state where the reproduced audio signal is enjoyable.

Here, as the audio visual devices to be suspended, there may be included not only the device selected by the rear-seat passengers but also another one which the driver concurrently selected and listened. If the audio visual device under reproducing operation is suspended when a signal indicative of a start of the reproduction is outputted, it is possible, at the time of resuming, to start the reproduction from the suspended point. This prevents information from being lost and offers the listener comfortable music environment.

As for the broadcasting devices such as a radio and a TV set, when their operations are once suspended, the contents of the suspended broadcasting are lost and can no longer be listened to. Therefore, in the following embodiments an audio visual system is provided to solve the above problem.

Ninth Embodiment

Figure 15:
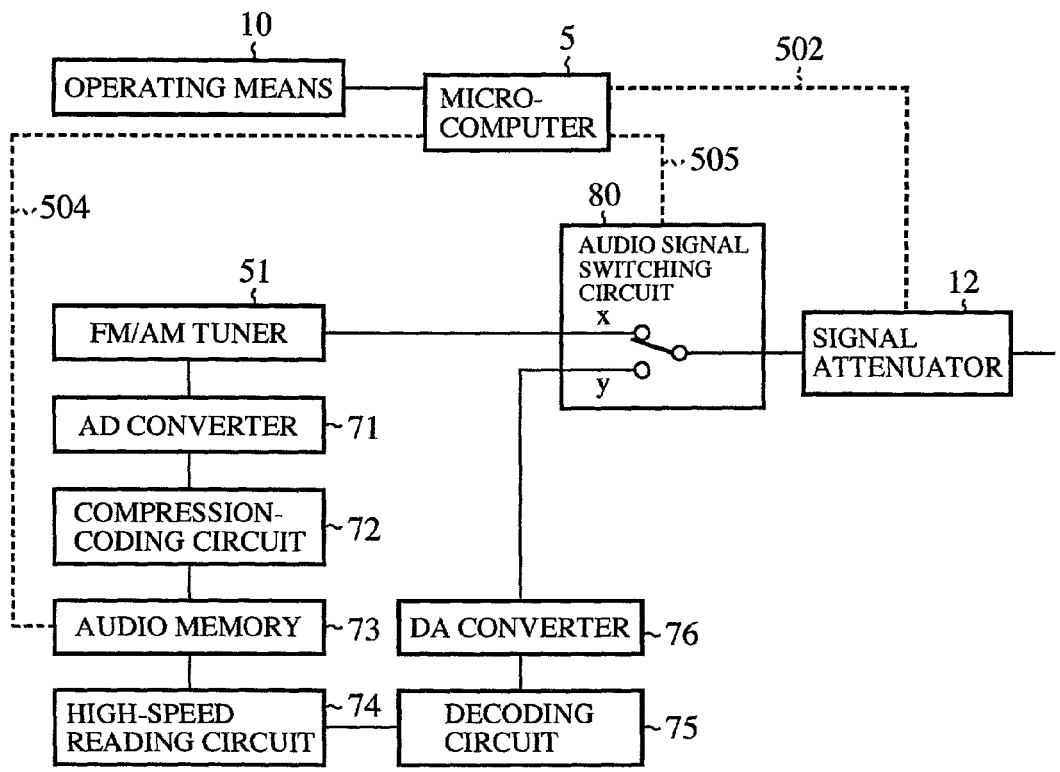
FIG. 15 is a circuit diagram showing a ninth embodiment.

FIG. 15 is a circuit diagram showing a ninth embodiment. In FIG. 15, the microcomputer 5, the operating means 10 and the signal attenuator 12 are the same as those used in the above embodiments. Reference numeral 51 denotes the FM/AM tuner for audio broadcasting incorporated in the above main component 4. The audio signal output is subject to analog-digital conversion by an analog/digital (AD) converter 71 and is further to compression and coding by a compression-coding circuit 72 for recording in an audio memory (an audio signal recording means) 73. Here, the AD converter 71 and the compression-coding circuit 72 constitute a compression-coding means. Reference numeral 74 denotes a high-speed reading circuit for reading the recorded signal from the audio memory 73. After the read signal is decoded into a digital signal by a decoding circuit 75, it is outputted by a DA converter 76 as an audio signal decoded at a high-speed which is substantially identical with the original one. The high-speed reading circuit 74, the decoding circuit 75, and the DA converter 76 constitute a decoding means. Reference numeral 80 denotes an audio signal switching circuit (a third audio signal switching means) for switching the audio signal output from the FM/AM tuner 51 and the reproduced audio signal of the DA converter 76, and for outputting it to the rear-seat headphones 8a, 8b.

Figure 16:
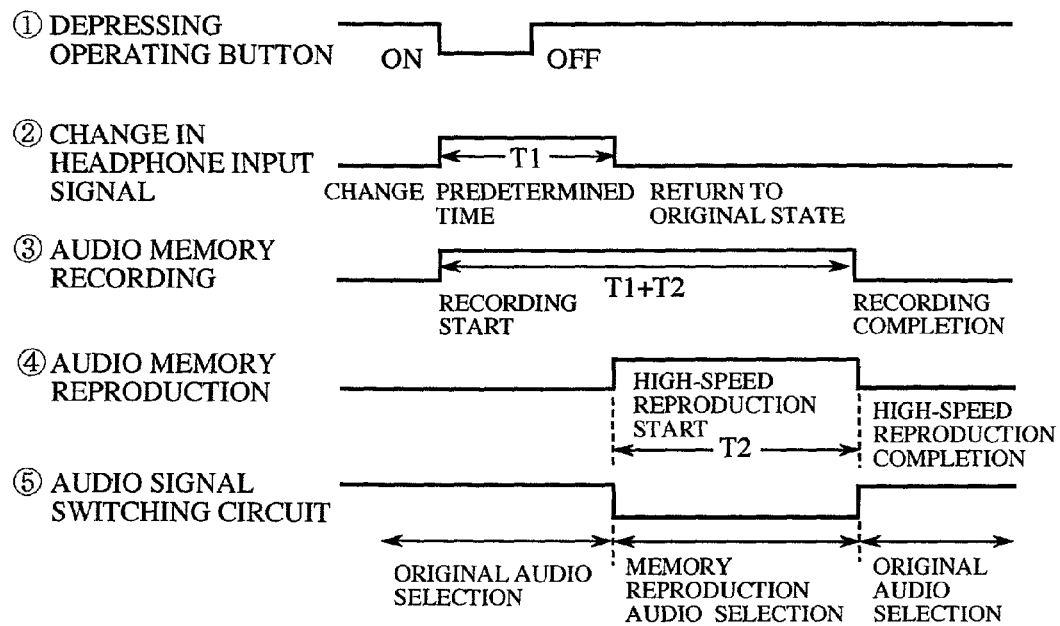
FIG. 16 is a timing chart showing the operation of a ninth embodiment.
Figure 17:
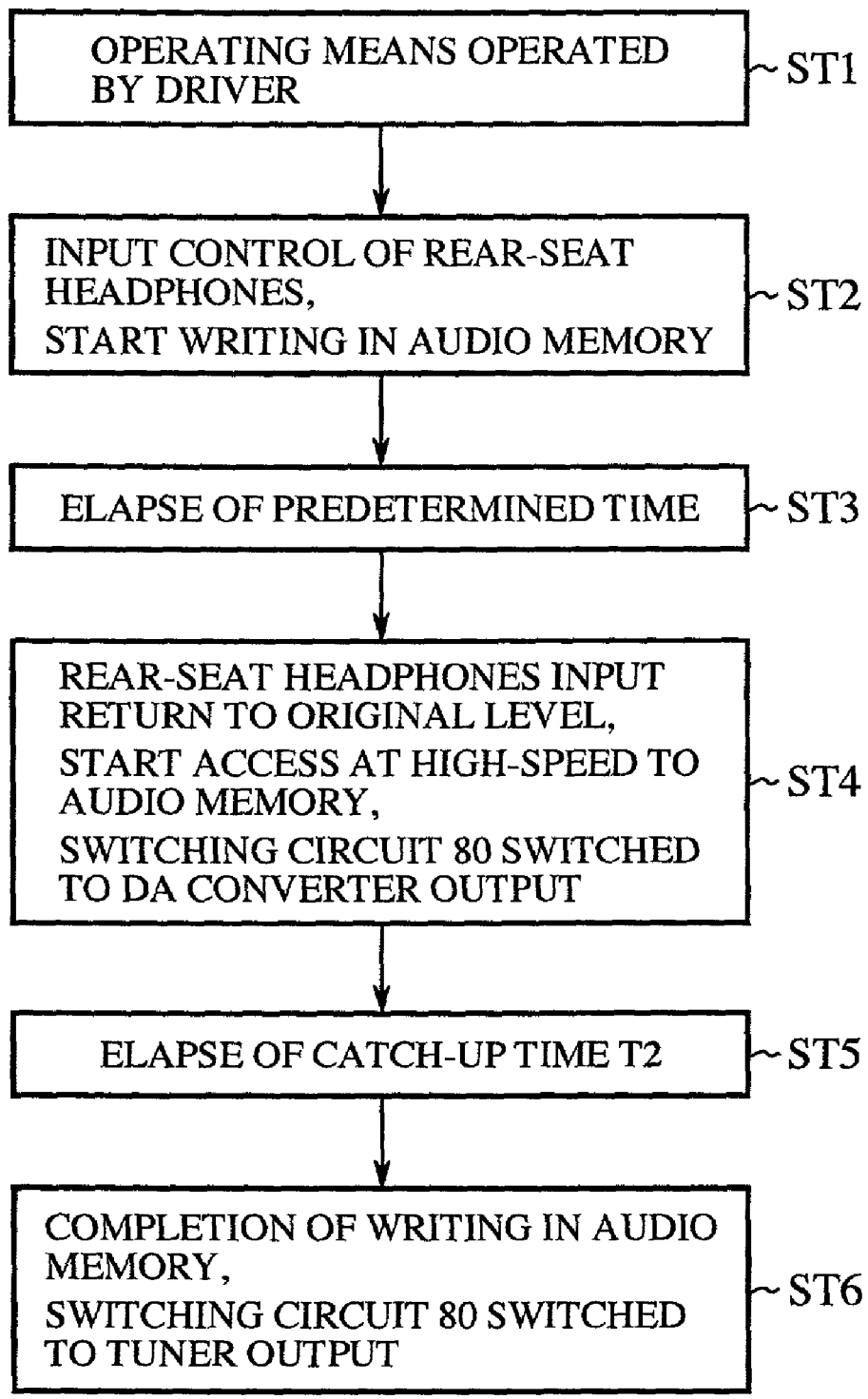
FIG. 17 is a flow chart explaining an operation of a ninth embodiment.

The operation of this circuit configuration will now be described with reference to both the timing chart in FIG. 16 and the flow chart in FIG. 17.

At step ST1, the driver operates the operating button of the operating means 10.

At step ST2, at a timing on which the operating button ① is depressed, an attenuation command signal is sent from the microcomputer 5 to the signal attenuator 12 through the signal line 502, for attenuation of the audio signal output from the FM/AM tuner 51, i.e., the input signal to the headphone ② begins attenuating. At the same time, a recording command signal is sent to the audio memory 73 through a signal line 504, for beginning recording of the compressed and coded signal of the audio signal output from the FM/AM tuner 51 ③ starting from a start address. In this state, the audio signal switching circuit 80 is switched to the side of "x" in which the audio signal output from the FM/AM tuner 51 is selected ⑤.

At step ST3, after an elapse of a predetermined time T1 from the time on which the operating button is switched on, the sending of the attenuation command signal that is being sent from the microcomputer 5 to the signal attenuator 12 is stopped.

At step ST4, the signal attenuator 12 then stops the attenuating operation and the level of the input signal to the rear-seat headphones 8a, 8b returns to the original one. In addition, upon the audio signal switching circuit 80 is switched to the "y" side, the reading ④, from the start address of the audio memory 73, of the compressed broadcasting audio signal is started by accessing at a high-peed.

At step ST5, the decoded high-speed audio signal read out at a high-speed from the audio memory 73 comes to the same broadcasting contents ④, ⑤ as that output from the FM/AM tuner 51, and thus the catch-up time T2 elapses.

At step ST6, the microcomputer 5 outputs a record-stopping signal to the audio memory 73 and also commands the audio signal switching circuit 80 to select the receiving signal of the FM/AM tuner 51. As a result, the input signal to the rear-seat headphones 8a, 8b is directly outputted to the FM/AM tuner 51.

Here, the catch-up time T2 can be calculated by the following formula $$T2=T1/(\beta-1)$$

where β is a compression coding factor.

As the compression coding means available here, there can be an audio compression technology such as an adaptive differential pulse code modulation (ADPCM), partial audio-correlation (PARCOR), or the like. It is appropriate to select the compression factor of about 1.1 to 1.5 while taking into consideration the sound quality level of the decoded audio. Generally, it has a tendency that the higher the compression factor, the more inferior the sound quality, but the saving of the memory capacity and the shortening of the catch-up time T2 are attained.

As can be seen from the above description of the operation, according to this embodiment, it is possible to listen to the broadcasting contents that could not be received during the time when the driver exchanged communication with the rear-seat passengers and, by reading at a high-speed though at some sacrifice of the sound quality, after an elapse of the time T2, the original sound can be listened successively.

Tenth Embodiment

Figure 18:
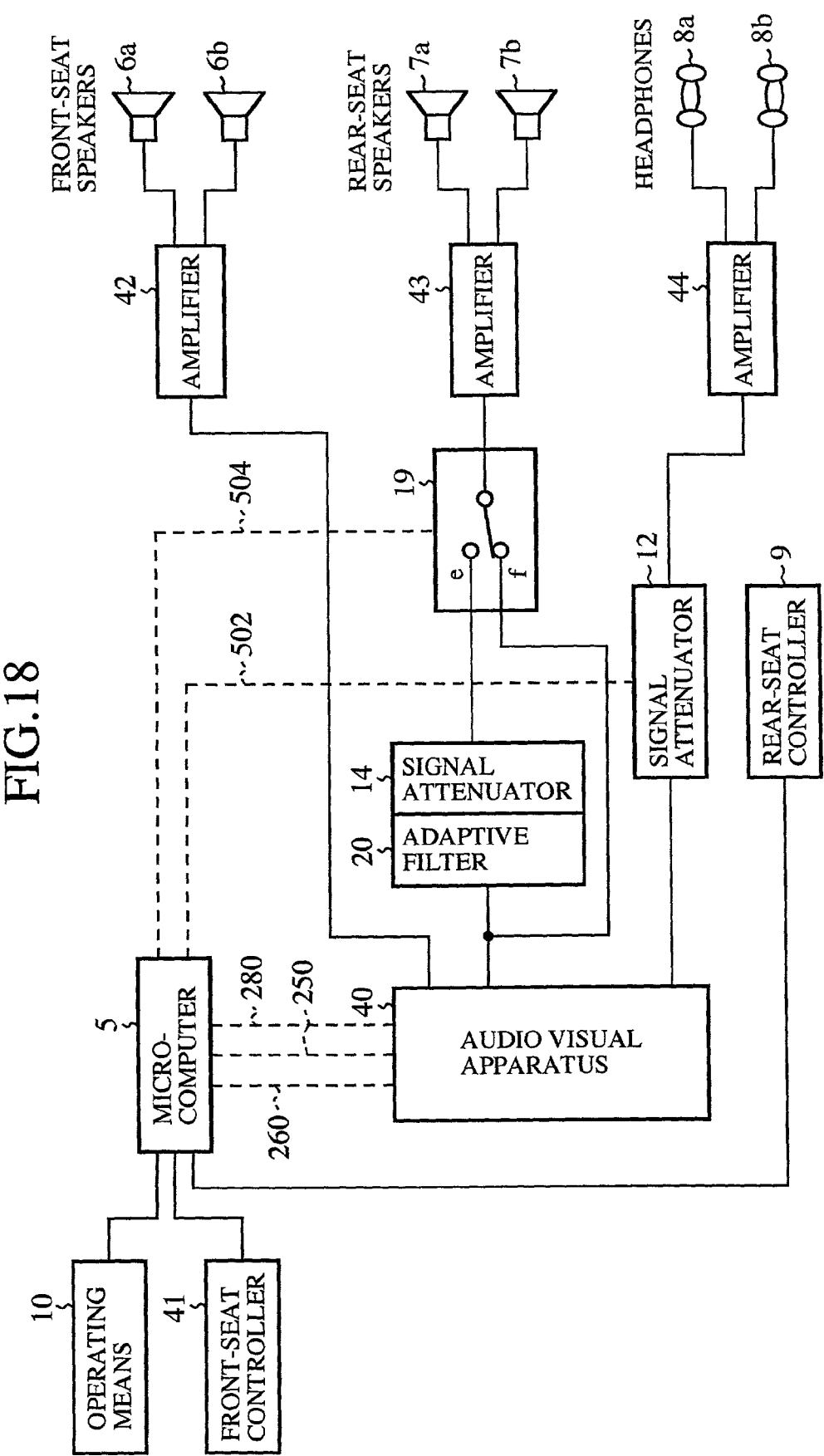
FIG. 18 is a circuit diagram showing a tenth embodiment.

FIG. 18 Is a circuit diagram showing a tenth embodiment. This embodiment is intended to solve the problem that the audio output from the rear speakers to which the driver is listening does not affect as noises the headphones for the rear-seat passengers.

In FIG. 18, what is different from the above circuit configuration shown in FIG. 3 is in that a sound field generating means including an adaptive filter 20 and a signal attenuator 14; as well as an audio signal switching circuit (a fourth audio signal switching means) 19 is added to the input signal line of the amplifier 43 to drive the rear-seat speakers 8a, 8b. In addition, while the headphones 8a, 8b are in use, a detecting signal indicating that the headphones are being used is sent from the audio visual apparatus 40 to the microcomputer 5 through a line 280, and a control signal is sent from the microcomputer 5 to the audio signal switching circuit 19 through a line 504 over the period during which the headphones is in use.

Figure 19A:
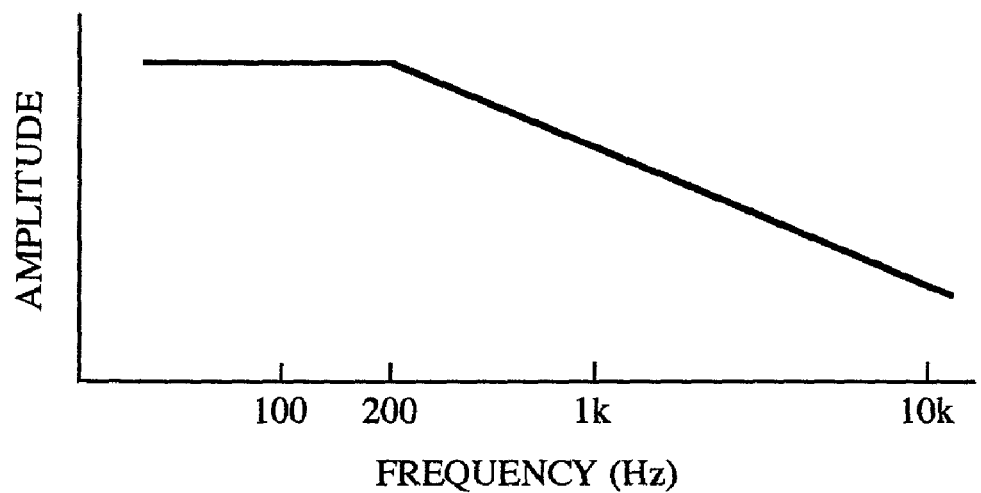
FIG. 19 is a characteristic diagram depicting an operation of a tenth embodiment.
Figure 19B:
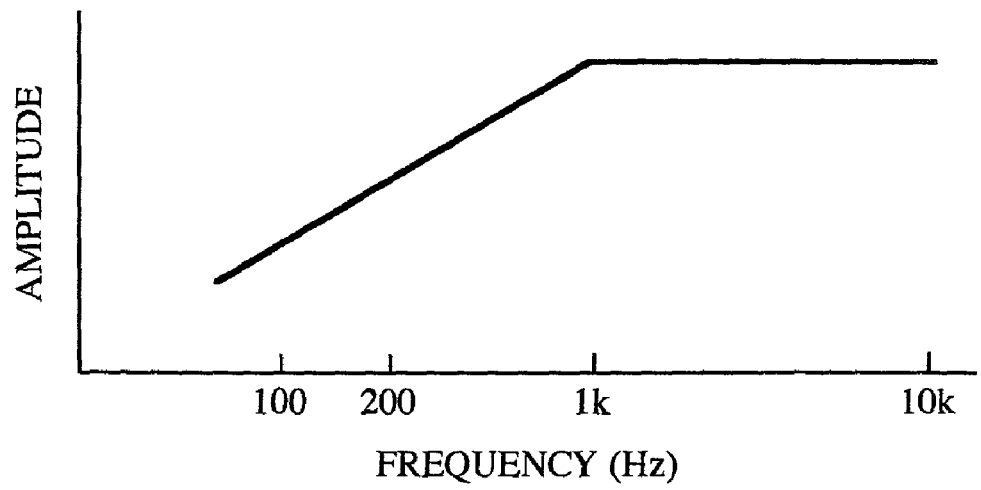

In view of the vehicle compartment in which the audio visual system is mounted, as well as of the positional relationship of the driver's seat relative to the space in the vehicle compartment, an audio is created so as to accomplish sound field reproducing characteristics that are most appropriate to the driver. The adaptive filter 20 is a conventional one which is designed to have filter characteristics varying depending on the sound field reproduction characteristics. For example, in a case where low-pitched sound output from the speakers 8a, 8b to be listened in the driver's seat is toned up, the adaptive filter 20 acts as a low pass filter having high-frequency attenuation characteristics as shown in FIG. 19A. In a case where surround-oriented reproduction is intended, the adaptive filter 20 acts as a high pass filter as shown in FIG. 19B. The cascade connection of the adaptive filter 20 and the signal attenuator 14 constitutes a sound field generating means.

In case the rear-seat passengers listen to the reproduced audio output from the selected audio visual device by putting on the headphones 8a, 8b (not shown), the reproduced audio signal sent to the headphones 8a, 8b is detected, and the detected signal indicating that the headphones is in use is outputted from the audio visual apparatus 40 and sent to the microcomputer 5 through a line 280. The control signal produced over the period during which the headphones is in use is sent from the microcomputer 5 to the audio signal switching circuit 19 through the line 504. In response to this control signal, the audio signal switching circuit 19 is switched to the side "e" of the sound field generating means including the adaptive filter 20 and the signal attenuator 14. Therefore, during this period, a reproduced audio signal of special signal characteristics is sent to the rear-seat speakers 7a, 7b in place of the reproduced audio signal directly output from the audio visual device.

While the rear-seat passengers who are listening to the middle sound ranging from 200 Hz to 800 Hz of the largest volume with the headphones 8a, 8b becomes lower in the reproduced audio level output from the rear-seat speaker 7a, 7b and, therefore, the reproduced audio will not influence on the rear-seat passengers who are listening with the headphones. On the other hand, the driver is able to hear out the sound components that are the main role of the rear-seat speakers 7a, 7b.

Therefore, while the driver is communicating with the rear-seat passengers by shutting out the input signal to the headphones 8a, 8b by the signal attenuator 12, the frequency components interfering with the communication are suppressed. The reproduced audio output from the rear-seat speaker 7a, 7b will thus not affect the rear-seat passengers. In addition, the arrangement of this embodiment may be substituted by combining the above first, fourth, fifth, and seventh embodiments, respectively. In this event, similar effect is exerted.

INDUSTRIAL APPLICABILITY

As described above, the onboard audio visual system according to this invention copes with the increase in the various media devices to be used inside the motor vehicle, as well as with the versatility in their uses. Particularly, this invention provides sufficient adaptability and actuality to solve the problems of the communication confronted when the driver and the rear-seat passengers enjoy different media at the same time, and practical use of the system is fully expected.

The invention claimed is:

1. An onboard audio visual system comprising:
a plurality of audio visual devices;
a front-seat speaker and a rear-seat speaker for outputting reproduced audio from one of said plurality of audio visual devices;
a headphone for rear-seat passengers for outputting a reproduced audio separately from a reproduced audio output from the rear seat speaker, from another one of said plurality of audio visual devices arbitrarily selected by the rear-seat passengers through a rear-seat control;
an operating device mounted in a front seat area in a neighborhood of a driver for performing a predetermined operation by the driver;
a control device for outputting a first control signal based on the operation performed by said operating device; and a first signal attenuator for abruptly attenuating an input signal provided to said headphone separately from an input signal provided to the rear-seat speaker, in response to said first control signal such that a volume in said headphone is zero, wherein the input signal provided from one of the audio visual device to the headphone is different from the input signal provided from the other audio visual device to the rear-seat speaker.

2. The onboard audio-visual system according to claim 1, wherein said operating device is arranged on a front operation panel for said plurality of audio visual devices, operating functional buttons of said audio visual devices are utilized for the operating device.

3. The onboard audio-visual system of claim 1, where the input signal to said headphone is abruptly attenuated by 10 db or more in response to said first control signal.

* * * * *